US012809502B2

(12) United States Patent
He et al.

(10) Patent No.: US 12,809,502 B2
(45) Date of Patent: Nov. 24, 2026

(54) CONTROL DISPLAY METHOD AND ELECTRONIC DEVICE

(71) Applicant: Huawei Technologies Co., Ltd., Shenzhen (CN)

(72) Inventors: Shujie He, Wuhan (CN); Shizong Cai, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/018,951

(22) Filed: Jan. 13, 2025

(65) Prior Publication Data

US 2025/0147643 A1 May 8, 2025

Related U.S. Application Data

(63) Continuation of application No. PCT/CN2023/117195, filed on Sep. 6, 2023.

(30) Foreign Application Priority Data

Sep. 30, 2022 (CN) ........................ 202211206525.1

(51) Int. Cl.
*G06F 3/0484* (2022.01)
*G06F 3/0481* (2022.01)
(Continued)

(52) U.S. Cl.
CPC .......... *G06F 3/0484* (2013.01); *G06F 3/0481* (2013.01); *G06F 3/0488* (2013.01); *G06F 3/14* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 7,010,755 B2 * | 3/2006 | Anderson | G06F 3/0481 | 715/779 |
| 7,346,855 B2 * | 3/2008 | Hellyar | G06F 3/0489 | 715/780 |

(Continued)

FOREIGN PATENT DOCUMENTS

| | | |
|---|---|---|
| CN | 111367456 A | 7/2020 |
| CN | 114327723 A | 4/2022 |
| CN | 114356258 A | 4/2022 |

OTHER PUBLICATIONS

Jerry: "The C# winform control scales with the window size", (Jan. 17, 2021), [online] https://www.jerrycoding.com/article/winform_scale/, total 8 pages.

*Primary Examiner* — Sarvesh J Nadkarni
(74) *Attorney, Agent, or Firm* — Slater Matsil, LLP

(57) ABSTRACT

An electronic device displays a window-based application on a screen of the electronic device, and the electronic device displays a system control in a display region of the window-based application in response to an operation performed by a user on the window-based application, where an actual display position and an actual display size of the system control follow a size and a position of a window. In the foregoing technical solution, the actual display position and the actual display size of the system control are adapted to the window-based application.

18 Claims, 17 Drawing Sheets

(51) Int. Cl.
*G06F 3/0488* (2022.01)
*G06F 3/14* (2006.01)

(56) References Cited

U.S. PATENT DOCUMENTS

| | | | | |
|---|---|---|---|---|
| 2013/0147787 | A1* | 6/2013 | Ignatchenko | H04N 21/41265<br>345/419 |
| 2013/0205239 | A1* | 8/2013 | Holland | G06F 3/04845<br>715/766 |
| 2013/0332881 | A1* | 12/2013 | Yook | G06F 3/04817<br>715/781 |
| 2014/0089833 | A1* | 3/2014 | Hwang | G06F 3/04886<br>715/780 |
| 2014/0164966 | A1* | 6/2014 | Kim | G06F 16/168<br>715/769 |
| 2016/0202852 | A1* | 7/2016 | Park | G06F 3/04845<br>715/781 |
| 2017/0024100 | A1* | 1/2017 | Pieper | H04L 12/1827 |
| 2017/0344253 | A1* | 11/2017 | Zhang | H04M 1/7243 |
| 2018/0121027 | A1* | 5/2018 | Kim | G06F 9/451 |
| 2019/0004673 | A1* | 1/2019 | Jang | G06F 3/0488 |
| 2019/0073123 | A1 | 3/2019 | Yang et al. | |
| 2019/0243516 | A1* | 8/2019 | Shim | G06F 3/0481 |
| 2023/0034967 | A1* | 2/2023 | Nathwani | G06F 3/0486 |
| 2023/0094172 | A1* | 3/2023 | Han | H04L 51/04<br>715/737 |
| 2023/0168854 | A1* | 6/2023 | Kim | G06F 1/1694<br>345/2.2 |
| 2024/0152245 | A1* | 5/2024 | Broughton | G06F 3/013 |

* cited by examiner

CONT. FROM FIG. 13A

CONTROL DISPLAY METHOD AND ELECTRONIC DEVICE

CROSS-REFERENCE TO RELATED APPLICATIONS

This application is a continuation of International Application No. PCT/CN2023/117195, filed on Sep. 6, 2023, which claims priority to Chinese Patent Application No. 202211206525.1, filed on Sep. 30, 2022. The disclosures of the aforementioned applications are hereby incorporated by reference in their entireties.

TECHNICAL FIELD

Embodiments of this application relate to the field of electronic device technologies, and more specifically, to a control display method and an electronic device.

BACKGROUND

A control is essential to each application. An exquisite interface may be formed by combining the controls. Generally, the control used by the application may include a system control and a customized control, where the system control is customized in a system and may be directly invoked by the application.

However, when the application is a window-based application, for example, the application is displayed in a floating manner or in a split-screen manner, the control may exceed a display region of a window when the application invokes the system control. As a result, a user cannot determine which application pops up the system control, heavily affecting user experience.

SUMMARY

Embodiments of this application provide a control display method and an electronic device, so that a system control invoked by a window-based application can be adapted to the window-based application, and the system control is prevented from exceeding a display region of a window, thereby improving user experience.

According to a first aspect, a control display method is provided, applied to an electronic device including a screen, where the method includes: displaying a first window, where the first window is used to display a first application, and an area of the first window is less than an area of the screen; and displaying a first system control in a display region of the first window in response to an operation performed by a user on the first application, where an actual display position and an actual display size of the first system control are determined based on a default display position and a default display size of the first system control and a scaling ratio of the first window to the screen, the actual display position and the actual display size of the first system control are adapted to the first window, and the default display position and the default display size of the first system control are adapted to the screen.

In this embodiment of this application, the first application is a window-based application. When the first application invokes the first system control, the first system control follows the size and the position of the first window, and the size and the position of the first system control are adapted to the first window. In this way, the first system control can be displayed in the display region of the first window, to avoid a problem that the first system control exceeds the display region of the first window when the first application invokes the first system control, thereby improving user experience.

With reference to the first aspect, in a possible implementation, the scaling ratio of the first window to the screen is a first ratio or a second ratio, where the first ratio is a ratio of a length of a long edge of the first window to a length of a long edge of the screen, and the second ratio is a ratio of a length of a short edge of the first window to a length of a short edge of the screen.

The length of the long edge of the first window, the length of the long edge of the screen, the length of the short edge of the first window, and the length of the short edge of the screen may be directly obtained. In this way, the scaling ratio is calculated in a simple and fast manner.

With reference to the first aspect, in a possible implementation, when the first ratio is not equal to the second ratio, the scaling ratio of the first window to the screen is a smaller ratio in the first ratio and the second ratio.

When the scaling ratio of the first window to the screen is the smaller ratio in the first ratio and the second ratio, it can be ensured that the first system control does not exceed the display region of the first window when the first system control follows the first window.

With reference to the first aspect, in a possible implementation, the actual display size of the first system control includes an actual width and an actual height; and the default display size of the first system control includes a preset width and a preset height, where the actual width is a product of the preset width and the scaling ratio, and the actual height is a product of the preset height and the scaling ratio.

The actual display size of the first system control may be determined by using the default display size of the first system control and the scaling ratio. The first system control is scaled down based on a same scaling ratio, so that it can be ensured that the first system control can be displayed in the display region of the first window, and does not exceed the display region of the first window.

With reference to the first aspect, in a possible implementation, the actual display position of the first system control includes a first horizontal coordinate and a first vertical coordinate that use an upper left corner of the first window as an origin; and the preset display position of the first system control includes a second horizontal coordinate and a second vertical coordinate that use an upper left corner of the screen as an origin, where the first horizontal coordinate is a product of the second horizontal coordinate and the scaling ratio, and the first vertical coordinate is a product of the second vertical coordinate and the scaling ratio.

The actual display position of the first system control may be determined by using the default display position of the first system control and the scaling ratio. The position of the first system control changes with the window, so that it can be ensured that the first system control can be displayed in the display region of the first window, and does not exceed the display region of the first window.

With reference to the first aspect, in a possible implementation, the actual display position of the first system control includes a first horizontal coordinate and a first vertical coordinate that use an upper left corner of the screen as an origin; the preset display position of the first system control includes a second horizontal coordinate and a second vertical coordinate that use the upper left corner of the screen as an origin; and coordinates of the upper left corner of the first window include a third horizontal coordinate and a third vertical coordinate that use the upper left corner of the screen as an origin, where the first horizontal coordinate is a value obtained by adding the third horizontal coordinate to a product of the second horizontal coordinate and the scaling ratio, and the first vertical coordinate is a value obtained by adding the third vertical coordinate to a product of the second vertical coordinate and the scaling ratio.

The first system control, the first window, and the screen are all in a same coordinate system, and therefore coordinate system conversion does not need to be performed.

With reference to the first aspect, in a possible implementation, before the displaying a first system control in a display region of the first window in response to an operation performed by a user on the first application, the method further includes: receiving the operation performed by the user on the first application; determining, based on the operation, that the first application invokes the first system control; determining, based on a size of the first window, that the first application is a window-based application; determining the scaling ratio based on a size of the first window and a size of the screen; and updating the default display position and the default display size of the first system control based on the scaling ratio, to obtain the actual display position and the actual display size of the first system control.

With reference to the first aspect, in a possible implementation, the first system control is any one of the following controls: a message prompt box, a system dialog box, a system warning prompt box, an error pop-up box, a floating box, an input method window, and a system status bar.

With reference to the first aspect, in a possible implementation, a Z order value of the first system control is greater than or equal to 2000 and less than or equal to 2999.

A type of a window of the first system control is a system window, and a level range of the window is 2000 to 2999.

With reference to the first aspect, in a possible implementation, the first window is a floating window or a split-screen window.

According to a second aspect, a control display method is provided, applied to an electronic device including a screen, where the method includes: displaying a first window, where the first window is used to display a first application, an area of the first window is less than an area of the screen, the first window corresponds to a first virtual screen, and a size and a position of the first virtual screen are consistent with a size and a position of the first window; and displaying a first system control in a display region of the first window in response to an operation performed by a user on the first application, where the first system control is displayed based on a default display position and a default display size, and the default display position and the default display size of the first system control are adapted to the first virtual screen.

In this embodiment of this application, when the first application is created, a virtual screen, namely, the first virtual screen, may be correspondingly created. In this way, a window-based application may be implemented based on the first virtual screen. Correspondingly, the system control may be adapted based on the size of the first virtual screen, instead of a size of the actual screen of the electronic device. In this way, the default display position and the default display size of the system control are adapted to the first virtual screen, that is, adapted to the first window. Therefore, the system control does not exceed the display region of the first window, thereby improving user experience.

With reference to the second aspect, in a possible implementation, the method further includes: creating the first virtual screen.

According to a third aspect, an electronic device is provided, including a screen and a display unit, where the display unit is configured to: display a first window, where the first window is used to display a first application, and an area of the first window is less than an area of the screen; and display a first system control in a display region of the first window in response to an operation performed by a user on the first application, where an actual display position and an actual display size of the first system control are determined based on a default display position and a default display size of the first system control and a scaling ratio of the first window to the screen, the actual display position and the actual display size of the first system control are adapted to the first window, and the default display position and the default display size of the first system control are adapted to the screen.

With reference to the third aspect, in a possible implementation, the scaling ratio of the first window to the screen is a first ratio or a second ratio, where the first ratio is a ratio of a length of a long edge of the first window to a length of a long edge of the screen, and the second ratio is a ratio of a length of a short edge of the first window to a length of a short edge of the screen.

With reference to the third aspect, in a possible implementation, when the first ratio is not equal to the second ratio, the scaling ratio of the first window to the screen is a smaller ratio in the first ratio and the second ratio.

With reference to the third aspect, in a possible implementation, the actual display size of the first system control includes an actual width and an actual height; and the default display size of the first system control includes a preset width and a preset height, where the actual width is a product of the preset width and the scaling ratio, and the actual height is a product of the preset height and the scaling ratio.

With reference to the third aspect, in a possible implementation, the actual display position of the first system control includes a first horizontal coordinate and a first vertical coordinate that use an upper left corner of the first window as an origin; and the preset display position of the first system control includes a second horizontal coordinate and a second vertical coordinate that use an upper left corner of the screen as an origin, where the first horizontal coordinate is a product of the second horizontal coordinate and the scaling ratio, and the first vertical coordinate is a product of the second vertical coordinate and the scaling ratio.

With reference to the third aspect, in a possible implementation, the actual display position of the first system control includes a first horizontal coordinate and a first vertical coordinate that use an upper left corner of the screen as an origin; the preset display position of the first system control includes a second horizontal coordinate and a second vertical coordinate that use the upper left corner of the screen as an origin; and coordinates of the upper left corner of the first window include a third horizontal coordinate and a third vertical coordinate that use the upper left corner of the screen as an origin, where the first horizontal coordinate is a value obtained by adding the third horizontal coordinate to a product of the second horizontal coordinate and the scaling ratio, and the first vertical coordinate is a value obtained by adding the third vertical coordinate to a product of the second vertical coordinate and the scaling ratio.

With reference to the third aspect, in a possible implementation, the electronic device further includes a processing unit, and before the display unit displays a first system control in a display region of the first window, the processing unit is configured to: receive the operation performed by the user on the first application; determine, based on the operation, that the first application invokes the first system control; determine, based on a size of the first window, that the first application is a window-based application; determine the scaling ratio based on a size of the first window and a size of the screen; and update the default display position and the default display size of the first system control based on the scaling ratio, to obtain the actual display position and the actual display size of the first system control.

With reference to the third aspect, in a possible implementation, the first system control is any one of the following controls: a message prompt box, a system dialog box, a system warning prompt box, an error pop-up box, a floating box, an input method window, and a system status bar.

With reference to the third aspect, in a possible implementation, a Z order value of the first system control is greater than or equal to 2000 and less than or equal to 2999.

With reference to the third aspect, in a possible implementation, the first window is a floating window or a split-screen window.

According to a fourth aspect, an electronic device is provided, including a screen and a display unit, where the display unit is configured to: display a first window, where the first window is used to display a first application, an area of the first window is less than an area of the screen, the first window corresponds to a first virtual screen, and a size and a position of the first virtual screen are consistent with a size and a position of the first window; and display a first system control in a display region of the first window in response to an operation performed by a user on the first application, where the first system control is displayed based on a default display position and a default display size, and the default display position and the default display size of the first system control are adapted to the first virtual screen.

With reference to the fourth aspect, in a possible implementation, the electronic device further includes a processing unit configured to create the first virtual screen.

According to a fifth aspect, an apparatus is provided. The apparatus is included in an electronic device, and the apparatus has a function of implementing an action in the first aspect or any one of the possible implementations of the first aspect, or has a function of implementing the behavior in the second aspect or any one of the possible implementations of the second aspect.

The function may be implemented by hardware, or may be implemented by hardware executing corresponding software. The hardware or the software includes one or more modules or units corresponding to the foregoing function, for example, a display module or unit, an obtaining module or unit, a receiving module or unit, and a processing module or unit.

According to a sixth aspect, an electronic device is provided, including one or more processors and one or more memories. The one or more memories store one or more computer programs, the one or more computer programs include instructions, and when the instructions are executed by the one or more processors, the electronic device is caused to perform the method in the first aspect or any one of the possible implementations of the first aspect, or perform the method in the second aspect or any one of the possible implementations of the second aspect.

According to a seventh aspect, a computer-readable storage medium is provided, including computer instructions. When the computer instructions are run on an electronic device, the electronic device performs the method in the first aspect or any one of the possible implementations of the first aspect, or performs the method in the second aspect or any one of the possible implementations of the second aspect.

According to an eighth aspect, a computer program product including instructions is provided. When the computer program product runs on a computer, the computer performs the method in the first aspect or any one of the possible implementations of the first aspect, or performs the method in the second aspect or any one of the possible implementations of the second aspect.

According to a ninth aspect, a chip is provided, where the chip includes a processor and a data interface. The processor reads, by using the data interface, instructions stored in a memory, to perform the method in the first aspect or any one of the possible implementations of the first aspect, or performs the method in the second aspect or any one of the possible implementations of the second aspect.

Optionally, in an implementation, the chip may further include a memory, the memory stores instructions, the processor is configured to execute the instructions stored in the memory, and when the instructions are executed, the processor is configured to perform the method in the first aspect or any one of the possible implementations of the first aspect, or perform the method in the second aspect or any one of the possible implementations of the second aspect.

The chip may be specifically a field programmable gate array or an application specific integrated circuit.

For beneficial effects of the apparatuses in the third aspect to the ninth aspect, refer to beneficial effects of the methods described in the first aspect and the second aspect. Details are not described herein again.

DETAILED DESCRIPTION OF ILLUSTRATIVE EMBODIMENTS

The following describes technical solutions of embodiments in this application with reference to accompanying drawings.

It should be noted that, in descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more, and "at least one" and "one or more" mean one, two, or more. The singular expression forms "one", "a", "the", "the foregoing", "this", and "the one" are intended to include an expression form like "one or more", unless the opposite is explicitly indicated in the context thereof.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

The method provided in embodiments of this application is applied to an electronic device, and the electronic device includes but is not limited to a mobile phone, a tablet computer, an in-vehicle device, a wearable device, an augmented reality (AR)/virtual reality (VR) device, a notebook computer, an ultra-mobile personal computer (UMPC), a netbook, a personal digital assistant (PDA), a smart screen, and another electronic device having a display. A specific type of the electronic device is not limited in embodiments of this application.

Figure 1:
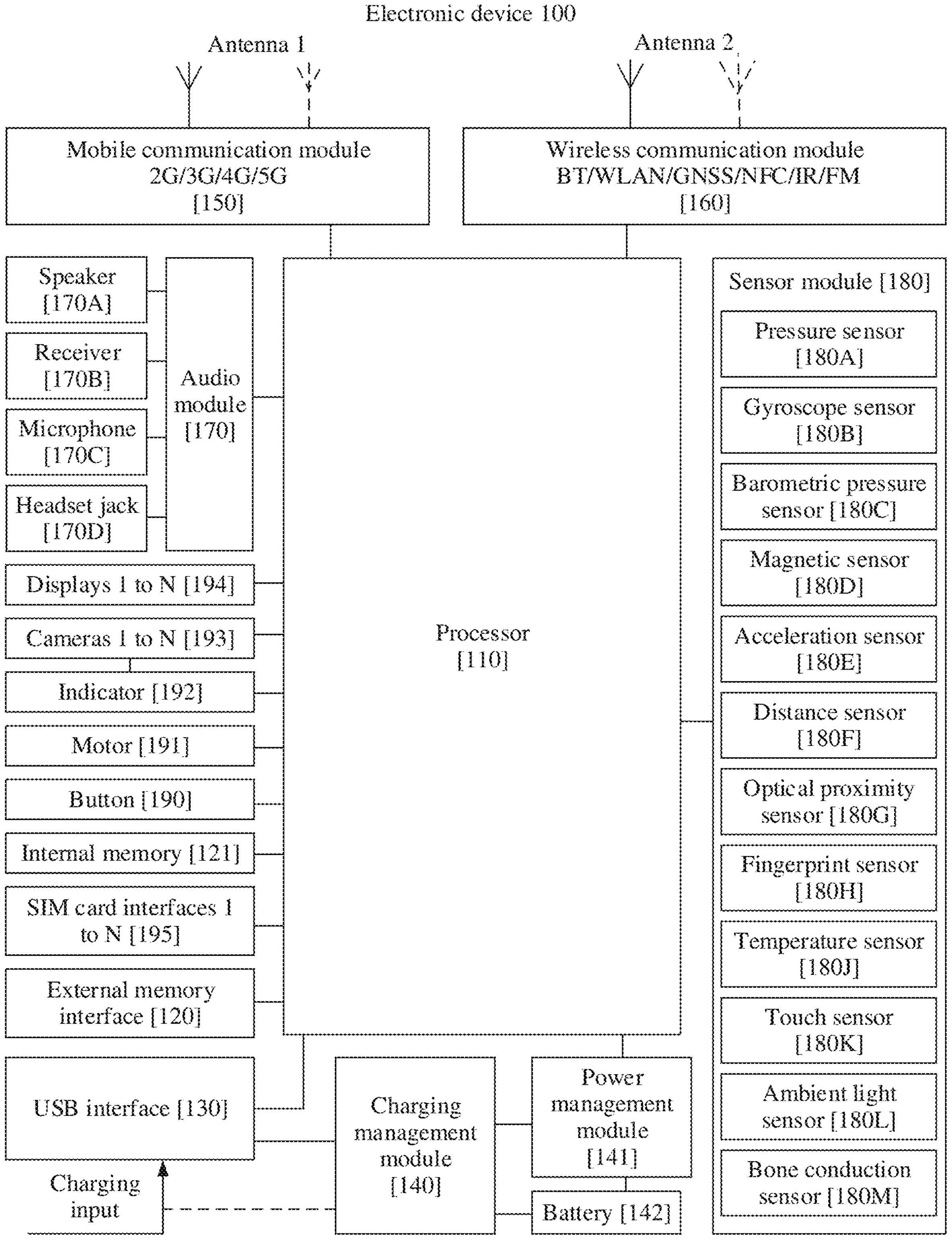
FIG. 1 is a diagram of a hardware structure of an electronic device according to an embodiment of this application.

For example, FIG. 1 is a diagram of a hardware structure of an electronic device according to an embodiment of this application.

As shown in FIG. 1, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like.

The processor 110 may include one or more processing units. For example, the processor 110 may include an application processor (AP), a modem processor, a graphics processing unit (GPU), an image signal processor (ISP), a controller, a video codec, a digital signal processor ( ) a baseband processor, and/or a neural-network processing unit (NPU). Different processing units may be independent devices, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

For example, the processor 110 communicates with the touch sensor 180K through the I2C bus interface, to implement a touch function of the electronic device 100. The processor 110 may communicate with the camera 193 through a camera serial interface (CSI) in the MIPI, to implement an image shooting function of the electronic device 100. The processor 110 may communicate with the display 194 through a display serial interface (DSI) in the MIPI, to implement a display function of the electronic device 100.

It may be understood that an interface connection relationship between the modules shown in the foregoing examples is merely used as an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The power management module 141 is configured to connect to the battery 142. While charging the battery 142, the charging management module 140 may further supply power to the electronic device 100 through the power management module 141. The power management module 141 may be further configured to monitor a parameter like a battery capacity, a quantity of battery cycles, and a battery health status.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization.

For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (near NFC) technology, an infrared (IR) technology, or the like. The wireless communication module 160 may be one or more devices integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 includes one or more GPUs, and the GPUs execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flex light-emitting diode (FLED), a Mini-LED, a Micro-LED, a Micro-OLED, a quantum dot light emitting diode (QLED), or the like. In some embodiments, the electronic device 100 may include one or N displays 194, where N is a positive integer greater than 1.

The electronic device 100 may implement an image shooting function through the camera 193, the ISP, the video codec, the GPU, the display 194, the application processor, and the like. The ISP is configured to process data fed back by the camera 193. The camera 193 is configured to capture a static image or a video. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The external memory interface 120 may be used to connect to an external storage card, for example, a micro SD card, to extend a storage capability of the electronic device 100. The external memory card communicates with the processor 110 through the external memory interface 120, to implement a data storage function. For example, a music file or a video file is stored in the external storage card.

The internal memory 121 may be configured to store one or more computer programs. The one or more computer programs include instructions. The processor 110 runs the instructions stored in the internal memory 121, so that the electronic device 100 performs the method provided in this application, and performs various function applications and data processing. The internal memory 121 may include a program storage area and a data storage area. The program storage area may store an operating system. The program storage area may further store one or more application programs (for example, a gallery or a contact) and the like. The data storage area may store data (for example, an image or a contact) or the like created during use of the electronic device 100. In addition, the internal memory 121 may include a high-speed random access memory, and may further include a non-volatile memory, for example, one or more disk storage devices, a flash device, or a universal flash storage (universal flash storage, UFS). In some embodiments, the processor 110 runs the instructions stored in the internal memory 121 and/or the instructions stored in the memory disposed in the processor 110, so that the electronic device 100 performs the method provided in embodiments of this application.

The electronic device 100 may implement an audio function, for example, music playing and recording, through the audio module 170, the speaker 170A, the receiver 170B, the microphone 170C, the headset jack 170D, the application processor, and the like, for example, audio playing or recording.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M.

The pressure sensor 180A is configured to sense a pressure signal, and can convert the pressure signal into an electrical signal. In some embodiments, the pressure sensor 180A may be disposed in the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may further calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the electronic device 100. In some embodiments, an angular velocity of the electronic device 100 around three axes (that is, axes x, y, and z) may be determined through the gyroscope sensor 180B. The gyroscope sensor 180B may be configured to implement image stabilization during image shooting. For example, when a shutter is pressed, the gyroscope sensor 180B detects an angle at which the electronic device 100 shakes, calculates, based on the angle, a distance for which a lens module needs to compensate, and allows the lens to cancel shaking of the electronic device 100 through reverse motion, to implement image stabilization. The gyroscope sensor 180B may further be used in a navigation scenario and a somatic game scenario.

It may be understood that when the electronic device 100 is static, the gyroscope sensor 180B may detect a magnitude and a direction of gravity. The gyroscope sensor may be further configured to identify a posture of the electronic device 100, and is used in an application like switching between landscape mode and portrait mode or a pedometer.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature like automatic unlocking of the flip cover is set based on a detected opening or closing state of a leather case or a detected opening or closing state of the flip cover.

The acceleration sensor 180E may detect accelerations of the electronic device 100 in various directions (usually on three axes).

The distance sensor 180F is configured to measure a distance. The electronic device 100 may measure the distance in an infrared manner or a laser manner. In some embodiments, in an image shooting scenario, the electronic device 100 may measure a distance through the distance sensor 180F to implement quick focusing.

The optical proximity sensor 180G may include, for example, a light-emitting diode (LED) and an optical detector, for example, a photodiode. The light emitting diode may be an infrared light emitting diode. The electronic device 100 emits infrared light through the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may further be used in a leather case mode or a pocket mode to automatically perform screen unlocking or locking.

The ambient light sensor 180L is configured to sense brightness of ambient light. The electronic device 100 may adaptively adjust brightness of the display 194 based on the sensed brightness of the ambient light. The ambient light sensor 180L may further be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to avoid abnormal shutdown of the electronic device 100 due to a low temperature. In some other embodiments, when the temperature is lower than still another threshold, the electronic device 100 boosts an output voltage of the battery 142 to avoid abnormal shutdown due to a low temperature.

The touch sensor 180K is also referred to as a "touch device". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may further be in contact with a human pulse, to receive a blood pressure beating signal. In some embodiments, the bone conduction sensor 180M may alternatively be disposed in a headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may obtain heart rate information through parsing based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback.

The indicator 192 may be an indicator light, and may be configured to indicate a charging status and a power change, or may be configured to indicate a message, a missed call, a notification, and the like.

The SIM card interface 195 is configured to connect to a SIM card.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The diagram of the possible hardware structure of the electronic device 100 is described above. A software system of the electronic device 100 may use a layered architecture, an event-driven architecture, a microkernel architecture, a micro service architecture, or a cloud architecture. In this embodiment of this application, an Android® system with the layered architecture is used as an example to illustrate a software structure of the electronic device 100.

Figure 2:
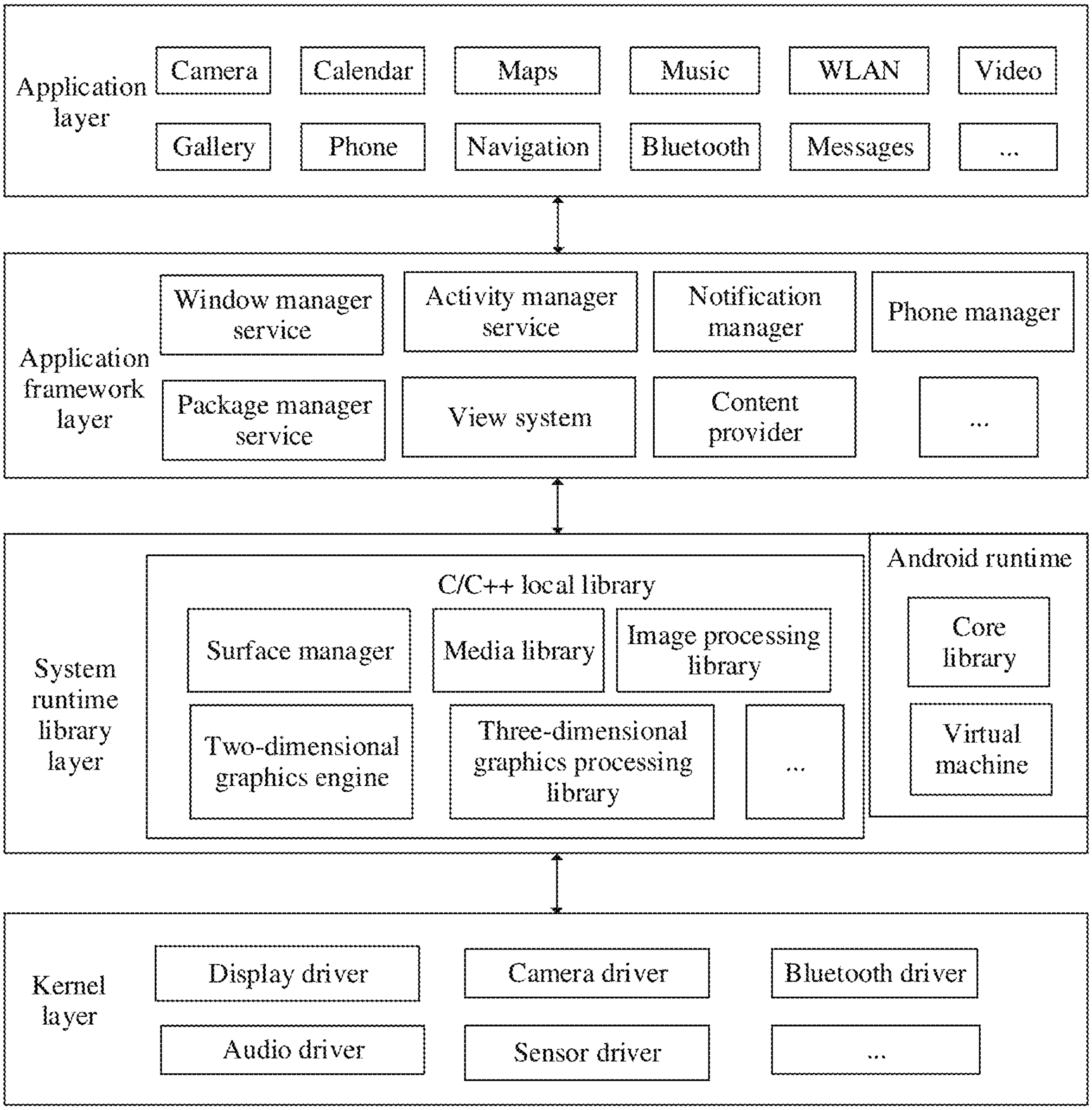
FIG. 2 is a diagram of a software structure of an electronic device according to an embodiment of this application.

FIG. 2 is a block diagram of a software structure of the electronic device 100 according to an embodiment of this application. In the layered architecture, software is divided into several layers, and each layer has a clear role and task. The layers communicate with each other through a software interface. In some embodiments, the Android® system is divided into four layers: an application layer, an application framework layer, a system library, and a kernel layer from top to bottom.

The application layer may include a series of application packages (application). As shown in FIG. 2, the application packages may include applications such as Camera, Gallery, Calendar, Phone, Maps, Navigation, WLAN, Bluetooth, Music, Video, and Messages. The application is mainly based on a user interface (UI), and is usually compiled by invoking an interface of the application framework layer by using a Java language.

The application in the electronic device may be in a running state, or may be in a non-running state. When the application is in the running state, the application may be classified into a foreground application and a background application based on different running positions. The foreground application runs in a foreground, and is displayed in a display interface of the electronic device. The background application runs in a background, and is not displayed in the display interface of the electronic device.

The application framework layer provides an application programming interface (API) and a programming framework for an application at the application layer. The application framework layer includes some predefined functions. As shown in FIG. 2, the application framework layer may include a window manger service, an activity manager service, a bundle manager service, a view system, a notification manager, a phone manager, a content provider, and the like.

The window manager service (WMS) is used to manage all windows (windows) in a system, and is mainly responsible for starting, adding, and deleting a window, managing a size, a boundary, and a level of the window, managing an input method window, displaying an animation effect when the window is switched, managing display of the window when a user is switched, and the like. The window manager service WMS may further be used as a transit station of an input event, and may update information of all of the windows to an input dispatcher (InputDispatcher), so that the input dispatcher distributes an input event generated when the user touches a screen to a proper window. The window manager service is a system service class and is a core of a window management mechanism.

The window described herein is an abstract concept. For ease of understanding, the window may be considered as a container or an abstract function set. A view (view) is a form of the window. The window is a carrier of the view. The view cannot exist independently, and has to be displayed on a screen based on the window.

Figure 3:
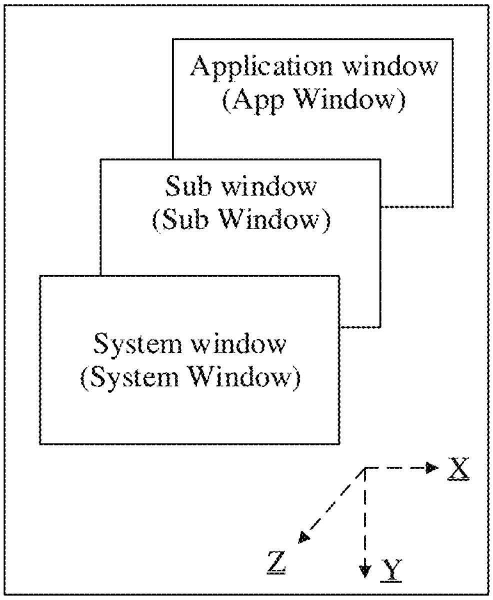
FIG. 3 is a diagram of a type of a window according to an embodiment of this application.

A plurality of types of windows are defined in the Android system. As shown in FIG. 3, the types of windows may include an application window (APP window), a sub window, and a system window. Each window has a corresponding level (or referred to as a Z order (z-ordered)), and a window with a larger level is at an upper layer of a window with a smaller level. The level of the window corresponds to a coordinate on a Z coordinate axis vertical to the screen. A larger Z coordinate indicates that the window is closer to the user and has a higher level, and therefore the window covers a window with a smaller level. A type needs to be specified for each window. During actual implementation, a type (type) parameter of the window determines the level for displaying the window and specifies the type of the window. The level of the application window ranges from 1 to 99. A level of the sub window ranges from 1000 to 1999. A level of the system window ranges from 2000 to 2999. Therefore, the application window is usually located at a bottom layer. The sub window needs to be attached to a parent window and is usually displayed above the application window. The system window is usually located at a top layer and is not covered by another window.

The application window is a window related to an application, and may include a base window, a common application window, and an application starting window. The base window is the basic window of another application window. A type of the base window is represented as TYPE_BASE_APPLICATION. All other application windows need to be displayed on windows of this type. The common application window usually corresponds to an activity (Activity), and a type of the common application window is represented as TYPE_APPLICATION. In the following embodiments of this application, unless otherwise specified, the described application window may be specifically a common application window. The application starting window is displayed when the application is started. The window of this type is used by the system to display other content before the application displays an own window of the application. A type of the application starting window is represented as TYPE_APPLICATION_STARTING.

The sub window may include a media (Media) window, a media overlay window, a dialog window, a popup window (PopupWindow), and the like. The media window is displayed after an application window to which the media window is attached. The Media window is used to display media content, such as a video. A type of the media window is represented as TYPE_APPLICATION_MEDIA. The media overlay window is used to display some overlays on the media window. The window of this type is displayed between the application window and the media window, and a type of the window is represented as TYPE_APPLICATION_MEDIA_OVERLAY. The dialog window is used to display a dialog box in an application window. A type of the dialog window is represented as TYPE_APPLICATION_ATTACHED_DIALOG. The popup window can use a view of any layout as content of the popup window. The window of this type floats above a current activity.

The system window is a window created by the system, and may include a system status bar, an input method window, a message prompt box (Toast), a system warning prompt box (for example, ANR), an error pop-up box, a floating pop-up box, and the like. A permission needs to be declared for creating the system window.

In the application, an operation on the window is performed through the WindowManager, and processing on the window is performed in the WindowMangerService. The WindowMangerService is an independent process. Therefore, interaction between the WindowManager and WindowMangerService is an inter process communication (IPC) process. The WindowMangerService determines which window needs to be displayed and where to display the window based on positions and sizes of windows on the screen. That is, visible regions of the windows are calculated. The position of the window that is described herein includes positions of the window on an X axis, a Y axis, and a Z axis.

Generally, the screen of the electronic device is two-dimensional space in which an upper left corner is used as an origin, a rightward direction is an X-axis direction, and a downward direction is a Y-axis direction. To facilitate management of a display order of the windows, a screen of a mobile phone is extended to three-dimensional space. To be specific, an additional Z axis is defined, and a direction of the Z axis is perpendicular to a surface of the screen and points to the outside of the screen. A plurality of windows are arranged on the virtual Z axis according to a sequence of the windows. Therefore, the display order of the windows is also referred to as a Z order (Z order or z-order).

The activity manager service (ActivityManagerService, AMS) is used to manage an application lifecycle and all aspects of an activity stack, and provides a common navigation rollback function. By using the activity manager, information about a running activity in the system, for example, a process, an application, a service, and a task can be obtained. For example, the activity manager may obtain global memory usage information, collect statistics on memory information in a process, obtain running process information (for example, obtain an activity that is running at a front end, and determine whether an application runs at the front end), and the like. The AMS can schedule activities of all applications in a unified manner. Therefore, the AMS can start an application after the user tap an application icon.

The package manager service (PackageManagerService, PMS) is an Android system service that implements functions such as app installation and uninstallation, component query and matching, and permission management.

The view system is used to construct an application, for example, may include a list, a grid, a text box, a button, and an embedded world wide web (world wide web) browser. The display interface of the electronic device may include one or more views.

The notification manager enables the application to display notification information in a status bar, and may be used to convey a notification message. The notification manager may automatically disappear after a short pause without requiring user interaction. For example, the notification manager is used to notify download completion and give a message notification. The notification manager may alternatively be a notification that appears in a top status bar of the system in a form of a graph or a scroll bar text, for example, a notification of an application that is run in the background, or may be a notification that appears in the screen in a form of a dialog window. For example, text information is displayed in the status bar, an announcement is given, the electronic device vibrates, or the indicator light blinks.

The phone manager is used to provide a communication function for the electronic device 100, for example, management of a call status (including answering, declining, or the like).

The content provider is used to: store and obtain data, and enable the data to be accessed by the application. The data may include a video, an image, audio, calls that are made and answered, a browsing history and bookmarks, an address book, and the like.

The system runtime library layer is a set of program libraries under the application framework layer, and can be divided into two parts: a system library and an Android runtime (Android runtime).

The Android runtime includes a kernel library and a virtual machine. The Android runtime is responsible for scheduling and management of the Android system. The kernel library includes two parts: a function that needs to be called in the Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library (which may also be referred to as a C/C++ local library) is a support of the application framework, and may include a plurality of functional modules, for example, a surface manager, a media library, a two-dimensional graphics engine, a three-dimensional graphics processing library, and an image processing library.

The surface manager is used to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG-4, H.264, MP3, AAC, AMR, JPG, and PNG.

The three-dimensional graphics processing library is used to implement three-dimensional graphics drawing, image rendering, composition, layer processing, and the like.

The two-dimensional graphics engine is a drawing engine for 2D drawing.

The kernel layer is a layer between hardware and software, and is used to provide essential functions of an operating system, such as file management, memory management, process management, and a network protocol stack. The kernel layer includes at least a display driver, a camera driver, an audio driver, a sensor driver, a Bluetooth driver, and the like.

The kernel layer may control hardware resources of a computer, and provide a standard interface for a hardware system (for example, a processor, a memory, a magnetic disk, or a printer) by using a hardware abstraction layer (HAL). The hardware abstraction layer is a hardware interface layer abstracted from a specific hardware platform, and is responsible for implementing functions and control of the specific hardware platform and providing a unified API interface for other software modules. Specifically, the hardware abstraction layer can abstract commonality of a hardware operation and control, hide a hardware interface detail of a specific platform, and provide a unified virtual hardware platform and control interface for upper-layer software, to isolate other software modules from underlying hardware, thereby facilitating system transplantation on a new hardware platform.

For ease of understanding, in the following embodiments of this application, the electronic device having the structures shown in FIG. 1 and FIG. 2 is used as an example to describe in detail the control display method provided in embodiments of this application with reference to the accompanying drawings and application scenarios.

A control is essential to each application. An exquisite interface may be formed by combining the controls. The control may be understood as a technical function for implementing specific display or a specific page/form. Generally, controls used by the application may include a system control and a customized control. The system control is customized in the system and can be directly used. The system control, for example, a message prompt box (like a Toast), a dialog box (like a System Dialog), an error pop-up box, a floating pop-up box (which is also referred to as a floating box), or a system status bar, is the most basic component in application development. The application may invoke the system control. The customized control is a new control generated by an application based on the system control and a requirement of the application. The customized control belongs to the application.

Figure 4:
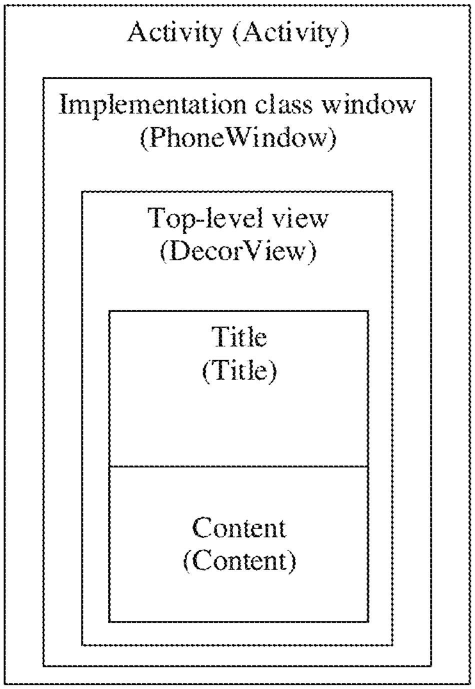
FIG. 4 is a diagram of a relationship between a control and a window according to an embodiment of this application.

FIG. 4 is a diagram of a relationship between a control and a window. As shown in FIG. 4, an activity is an application component, and is further an interface carrier, and can display a page and interact with a user. Each activity corresponds to an application window. Generally, a size of each activity window is equal to a size of a screen. Therefore, an uppermost activity window (namely, a currently activated activity window) is visible provided that a different Z-axis position is set for each activity window. A specific implementation class of the window is PhoneWindow. A PhoneWindow object is created for each activity. The PhoneWindow object is an interface for interaction between the activity and an entire view system, and is the most basic window system. The PhoneWindow has a top-level view DecorView, and the PhoneWindow sets the DecorView as a root view of the entire application window. The DecorView is a root node view in a view tree. The DecorView does not present anything to the user, but can divide the screen into two regions: a title bar and a content (Content) bar. Usually, a layout file set in the activity is loaded to the content bar for displaying to the user.

In short, the activity is responsible for interface display, user interaction, and service logic processing. The activity uses the window to display a view element. The window is a carrier of the view, and the view is specific display of the window. The view includes the system control and the customized control that are mentioned above. Each control is carried by a corresponding window. For example, the system control is carried by a system window, and the customized control is carried by a sub window. The WMS can specify a type, an x position, and a y position of the control (or the window), so that the control is displayed to the user at a corresponding position.

Figure 5:
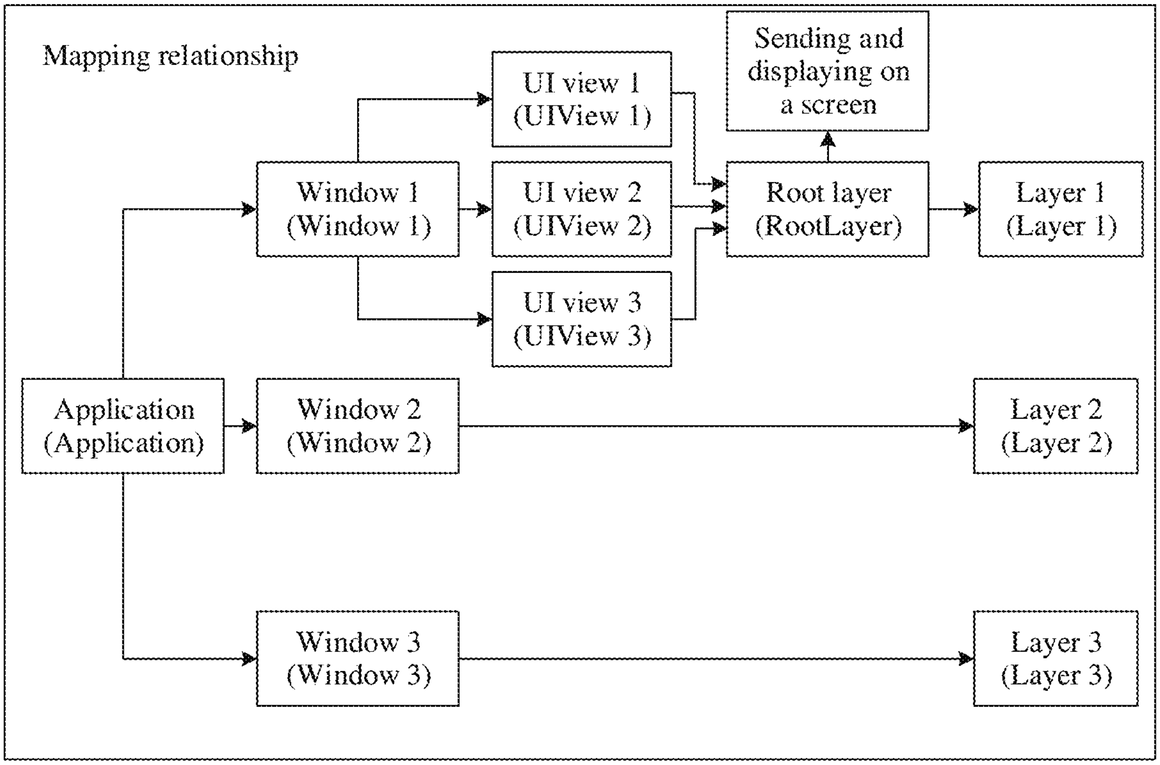
FIG. 5 is a diagram of a mapping relationship of windows according to an embodiment of this application.

FIG. 5 is a diagram of a mapping relationship of windows. As shown in FIG. 5, an application may include a plurality of windows, for example, a window 1, a window 2, and a window 3 shown in FIG. 5. Each window further includes different controls (for example, the system control and/or the customized control). The window 1 is used as an example. The window 1 may include a UI view 1 (UIView 1), a UI view 2 (UIView 2), a UI view 3 (UIView 3), and the like. Each UI view may be understood as a control. The UI views in the window 1 may be combined into one layer. Different windows correspond to different layers. For example, the window 1 corresponds to a layer 1, the window 2 corresponds to a layer 2, and the window 3 corresponds to a layer 3. There is a root layer (RootLayer) in the plurality of layers. A graphics synthesis system (for example, the SurfaceFlinger service) can mix content of a plurality of windows based on a z-order, and output mixed content for display. It may be understood that quantities of windows, UI views, and layers shown in FIG. 5 are merely examples, and do not constitute any limitation on this application.

With continuous development of electronic device technologies, a size of a screen of an electronic device like a mobile phone or a tablet computer is increasingly large, and an increasing quantity of applications (Apps) are installed on the electronic device. To meet a personalized requirement of the user, an increasing number of electronic devices support a multi-window mode (which is also referred to as a multi-screen mode), that is, a plurality of applications can be simultaneously run and displayed on one screen.

When the electronic device is in the multi-window mode, a display manner of an application window includes full-screen display, split-screen display, and floating display.

Full-screen display, also referred to as a full-screen mode, means that only one application window is displayed on the screen, and an interface of an application fills the entire screen. In embodiments of this application, when a window is displayed in a full-screen display manner, a state of the window is a full-screen state, and the window is defined as a full-screen window. Correspondingly, an application displayed in the window is a full-screen display application.

Split-screen display, also referred to as a split-screen mode, means that two or more application windows separately occupy a part of the screen, where any two application windows do not overlap each other, a size of each application window may change, and a position of the application window cannot be moved, or a position of the application window may be moved to only a fixed position, for example, positions of two application windows are exchanged. In this embodiment of this application, when a window is displayed in a split-screen manner, a state of the window is a split-screen state, and the window is defined as a split-screen window. Correspondingly, an application displayed in the window is a split-screen display application.

Floating display, also referred to as a floating mode, means that at least one application window is displayed in a floating manner on another user interface, and partially covers the another user interface. When the user does not perform an operation on the floating display application window, the application window displayed in a floating manner remains at a fixed position and does not change with a change of the another user interface. The at least one application window is displayed in a stacked manner on the screen, the application windows may partially or completely cover each other, and each application window may be changed in size or may be moved. In this embodiment of this application, when a window is displayed in the floating manner, for example, floats above a window displayed in the full-screen manner or floats above a window displayed in the split-screen manner, a state of the window is a floating state, and the window is defined as a floating window. Correspondingly, an application displayed in the window is a floating display application.

Compared with the window of the full-screen display application, windows of the split-screen display application and windows of the floating display application each occupy only a part of the screen. Therefore, in embodiments of this application, the split-screen display application and the floating display application may alternatively be collectively referred to as window-based applications.

As mentioned above, the application may invoke the system control. However, when the application is the window-based application, the control may exceed a display region of the window when the application invokes the system control. This is because a display position of the system control on the screen is fixed. The display position of the system control is defined by a system. For example, the system defines the system control to be located at the bottom, the middle, or the top of the screen. In short, the position of the system control is defined relative to the screen. Therefore, the system control is displayed based on the screen. If the application is the full-screen display application, the application window covers the entire screen. When the application invokes the system control, the position of the system control relative to the screen can be adapted to the application window. If the application is the window-based application, the application window does not cover the entire screen, but occupies a part of the screen. When the application invokes the system control, the system does not know which application is to invoke the system control. Therefore, the system control is still displayed at a preset position relative to the screen, and is not displayed following the application window. As a result, the system control exceeds the display region of the window, which may cause misunderstanding of the user.

Figure 6A:
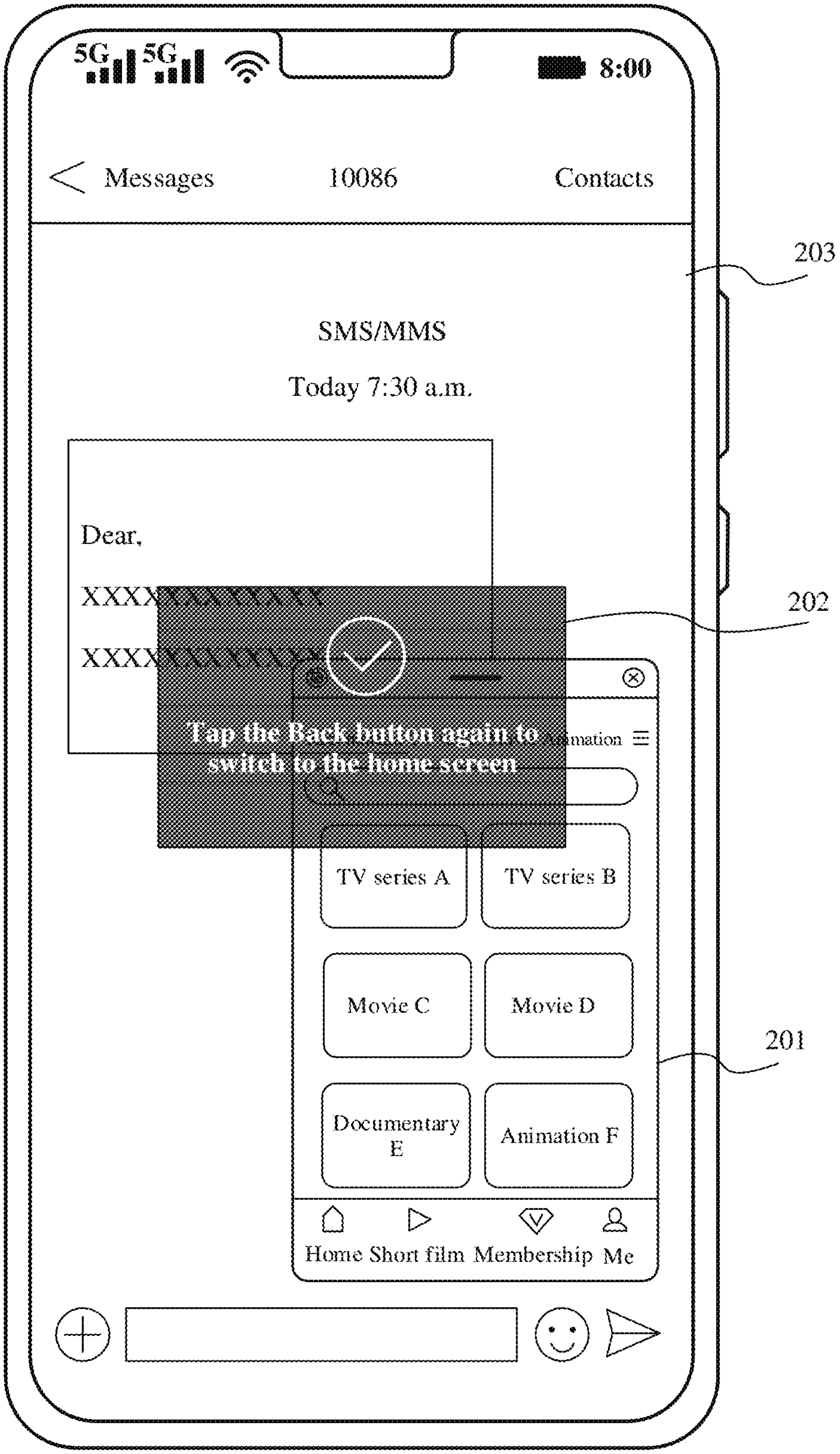
FIG. 6(*a*) and FIG. 6(*b*) are diagrams of a user interface of an existing control display solution.
Figure 6B:
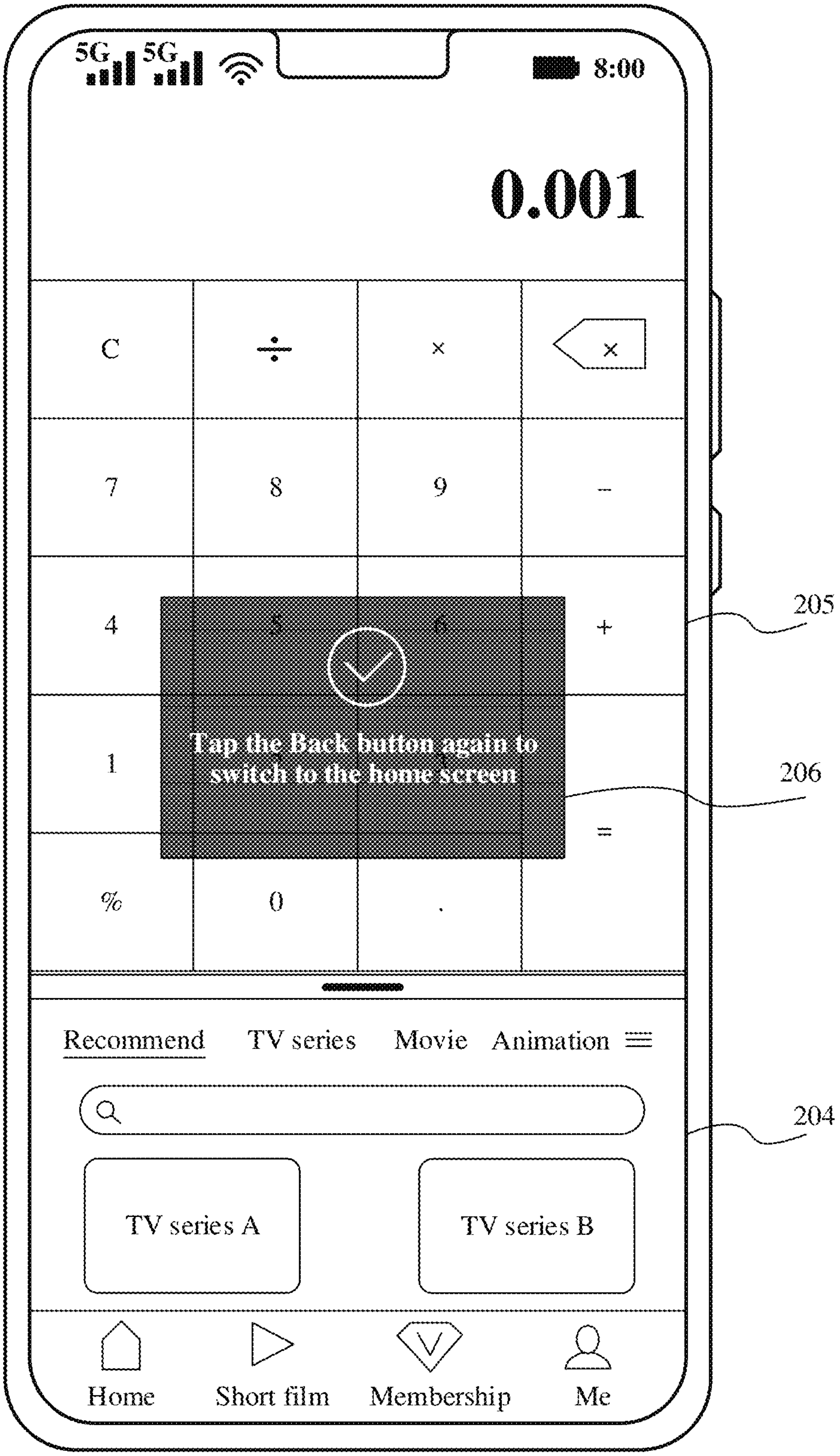

For example, as shown in FIG. 6(*a*), an application displayed in a window 201 is a window-based application, and the window-based application is displayed above another full-screen window 203 in a floating manner. When the user performs an operation on the window-based application, for example, taps a Back button, the window-based application invokes a system dialog control 202, to prompt the user to "Tap the Back button again to switch to the home screen". The dialog control 202 is displayed at the middle of the screen based on the screen. In this case, the window-based application is in a floating window form and occupies a part of the screen. As a result, the dialog control 202 exceeds a display region of the floating window.

As shown in FIG. 6(*b*), applications displayed in a window 204 and a window 205 both are window-based applications. Specifically, the two window-based applications each are a split-screen display application, the window 204 and the window 205 form an upper and lower split-screen form, and a display region of the window 205 is larger than a display region of the window 204. When the user performs an operation on the window-based application in the window 204, for example, taps a Back button, the window-based application invokes a system dialog control 206, to prompt the user to "Tap the Back button again to switch to the home screen". The dialog control 206 is displayed at the middle of the screen based on the screen. In this case, the window-based application is in a split-screen form, and the display region of the window 205 is larger than the display region of the window 204. Therefore, the dialog control 206 is displayed in the region of the window 205. However, actually, the dialog control 206 is invoked by the application in the window 204, and prompt content indicates that the application in the window 204, instead of the application in the window 205, needs to be switched to the home screen.

In conclusion, currently, when the window-based application needs to actively invoke the system control, the system control is displayed at the bottom, the middle, or the top of the screen based on a preset position that is set when the application is in the full-screen state. In this case, the system control is prone to exceed the display region of the window. Consequently, the user cannot determine which application pops up the system control, heavily affecting user experience.

Figure 7:
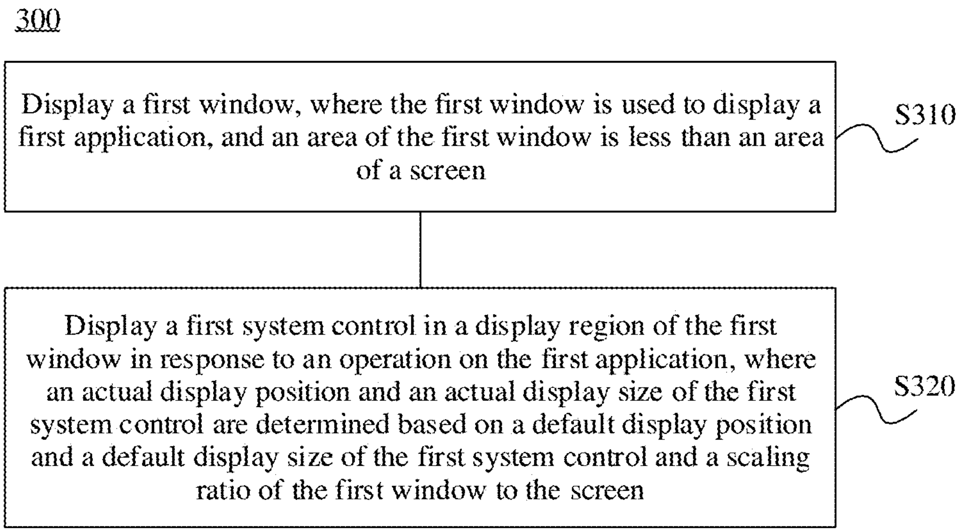
FIG. 7 is a schematic flowchart of a control display method according to an embodiment of this application.

FIG. 7 is a schematic flowchart of a control display method according to an embodiment of this application. The method is applied to an electronic device, and the electronic device may be, for example, the electronic device 100 shown in FIG. 1. In some embodiments, the electronic device may have the software architecture shown in FIG. 2. As shown in FIG. 7, the method 300 may include step S310 and step S320.

S310: The electronic device displays a first window, where the first window is used to display a first application, and an area of the first window is less than an area of a screen.

In this embodiment of this application, the first window is an application window. For example, the first window is a common application window. For example, during specific implementation, a type of the first window may be represented as TYPE_APPLICATION.

Herein, the area of the screen may be understood as a maximum area that can be displayed by a display of the electronic device. In this embodiment of this application, the area of the first window is less than the area of the screen, that is, the first window occupies a part of the screen to display content. Correspondingly, the first application is a window-based application.

In some embodiments, the first application may be a floating display application or a split-screen display application. Correspondingly, the first window may be a floating window or a split-screen window.

S320: The electronic device displays a first system control in a display region of the first window in response to an operation performed by a user on the first application.

An actual display position and an actual display size of the first system control are determined based on a default display position and a default display size of the first system control and a scaling ratio of the first window to the screen.

In this embodiment of this application, the actual display position and the actual display size of the first system control are adapted to the first window, and the default display position and the default display size of the first system control are adapted to the screen of the electronic device.

That is, the first system control has a preset display position and a preset display size, but the default display position and the default display size are defined based on a size of the screen. When the first application invokes the first system control, the first application is the window-based application, and the actual display position and the actual display size of the first system control need to follow a size and a position of the first window, to be adapted to the first window.

Herein, the operation performed by the user on the first application may be any operation that requires the first application to invoke the system control for responding, for example, a tap operation, a slide operation, or an input operation. This is not limited in this embodiment of this application.

It may be understood that the electronic device displays the first system control in response to the operation performed by the user on the first application. Therefore, the first system control is actually actively invoked by the first application. A type of the window of the first system control is a system window.

In this embodiment of this application, the first application is the window-based application. When the first application invokes the first system control, the first system control follows the size and the position of the first window, and the size and the position of the first system control are adapted to the first window. In this way, the first system control can be displayed in the display region of the first window, to avoid a problem that the first system control exceeds the display region of the first window when the first application invokes the first system control, thereby improving user experience.

In some embodiments, the scaling ratio of the first window to the screen is a first ratio or a second ratio, where the first ratio is a ratio of a length of a long edge of the first window to a length of a long edge of the screen, and the second ratio is a ratio of a length of a short edge of the first window to a length of a short edge of the screen.

Figure 8:
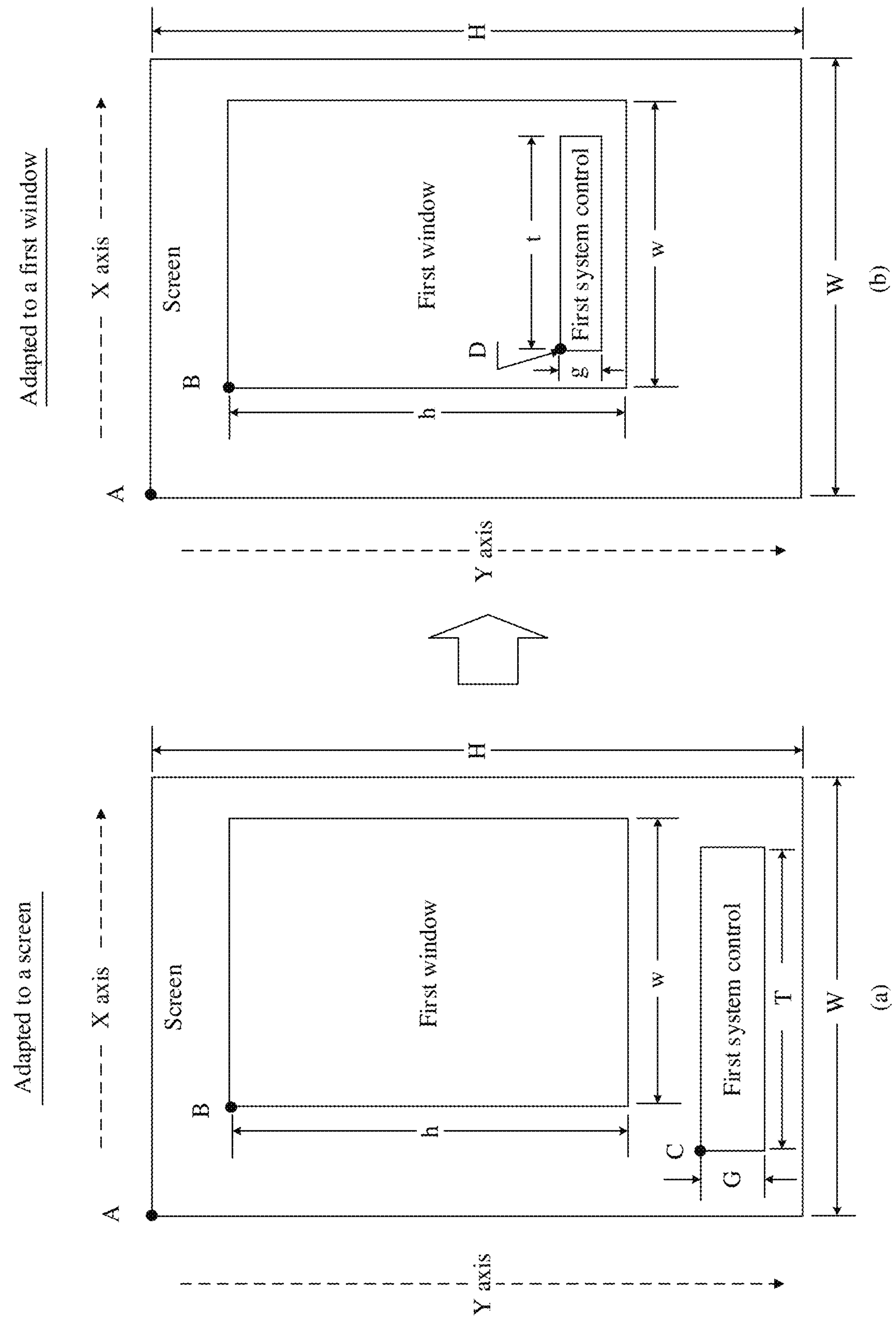
FIG. 8 is a diagram of a control display method according to an embodiment of this application.

For ease of understanding, FIG. 8 is used as an example. (a) or (b) in FIG. 8 shows an example of the screen of the electronic device and the first window displayed on the screen. If the length of the long edge of the first window is h, and the length of the long edge of the screen is H, the first ratio is h/H. If the length of the short edge of the first window is w, and the length of the short edge of the screen is W, the second ratio is w/W. That is, the scaling ratio of the first window to the screen may be h/H or w/W.

In some embodiments, if the first window is scaled proportionally relative to the screen, the first ratio is equal to the second ratio, that is, h/H=w/W.

In some embodiments, if the first window is not scaled proportionally relative to the screen, the first ratio is not equal to the second ratio, that is, h/H+w/W. In this case, the scaling ratio of the first window to the screen may be the first ratio or the second ratio, or may be a smaller ratio in the first ratio and the second ratio.

When the scaling ratio of the first window to the screen is the smaller ratio in the first ratio and the second ratio, it can be ensured that the first system control that has the actual display position and the actual display size and that is obtained in step S320 does not exceed the display region of the first window.

In some embodiments, the scaling ratio of the first window to the screen may be a third ratio, where the third ratio is a ratio of the area of the first window to the area of the screen.

In some embodiments, the scaling ratio of the first window to the screen may be a fourth ratio, where the fourth ratio is a ratio of a length of a diagonal of the first window to a length of a diagonal of the screen.

It may be understood that, because the display region of the first window occupies a part of the screen, and the area of the first window is less than the area of the screen, the scaling ratio of the first window to the screen is less than 1.

In some embodiments, the actual display size of the first system control includes an actual width and an actual height. The default display size of the first system control includes a preset width and a preset height. The actual width is a product of the preset width and the scaling ratio, and the actual height is a product of the preset height and the scaling ratio.

For ease of understanding, FIG. 8 is still used as an example. (a) in FIG. 8 is a diagram in which the first system control is adapted to the screen based on the default display size, (b) in FIG. 8 shows a diagram in which the first system control is adapted to the first window based on the actual display size, and a position of the first window on the screen and a size of the first window that are shown in (a) in FIG. 8 are consistent with a position of the first window on the screen and a size of the first window that are shown in (b) in FIG. 8.

As shown in (a) in FIG. 8, the default display size of the first system control includes a preset width T and a preset height G. As shown in (b) in FIG. 8, the actual display size of the first system control includes an actual width t and an actual height g. The actual width t is a product of the preset width T and the determined scaling ratio, and the actual height g is a product of the preset height G and the determined scaling ratio.

To be specific, when the scaling ratio and the preset display size of the first system control are known, the actual width of the first system control displayed in the first window may be obtained by using the preset width T×the scaling ratio, and the actual height of the first system control displayed in the first window may be obtained by using the preset height G×the scaling ratio.

In this way, when the first application invokes the first system control, the size of the first system control changes with the size of the first window. The first system control is scaled down based on a same scaling ratio, so that it can be ensured that the first system control can be displayed in the display region of the first window, and does not exceed the display region of the first window.

In some embodiments, the actual display position of the first system control includes a first horizontal coordinate and a first vertical coordinate that use an upper left corner of the first window as an origin. The preset display position of the first system control includes a second horizontal coordinate and a second vertical coordinate that use an upper left corner of the screen as an origin. The first horizontal coordinate is a product of the second horizontal coordinate and the scaling ratio, and the first vertical coordinate is a product of the second vertical coordinate and the scaling ratio.

For ease of understanding, FIG. 8 is still used as an example. (a) in FIG. 8 is a diagram in which the first system control is adapted to the screen based on the default display position, (b) in FIG. 8 shows a diagram in which the first system control is adapted to the first window based on the actual display position, and the position of the first window on the screen and the size of the first window that are shown in (a) in FIG. 8 are consistent with the position of the first window on the screen and the size of the first window that are shown in (b) in FIG. 8.

As shown in (a) in FIG. 8, coordinates of the preset display position of the first system control may use an upper left corner A of the screen as an origin. A direction from the origin A to the right is a positive axis of an X axis, and a direction from the origin A to the bottom is a positive axis of a Y axis. In this case, two-dimensional coordinates of the point A in a coordinate system on which the screen is based (for ease of description, referred to as a second coordinate system below) are (0, 0). Usually, during specific implementation, coordinates of a point on the first system control may represent the position of the first system control. For example, herein, an upper left corner C of the first system control represents the preset display position of the first system control. Correspondingly, the preset display position of the first system control may include the second horizontal coordinate and the second vertical coordinate, that is, coordinates of the point C in the second coordinate system are (the second horizontal coordinate, the second vertical coordinate).

As shown in (b) in FIG. 8, coordinates of the actual display position of the first system control may use an upper left corner B of the first window as an origin. A direction from the origin B to the right is a positive axis of an X axis, and a direction from the origin B to the bottom is a positive axis of a Y axis. In this case, two-dimensional coordinates of the point B in a coordinate system on which the first window is based (for ease of description, referred to as a first coordinate system below) are (0, 0). Similarly, herein, an upper left corner D of the first system control represents the actual display position of the first system control. Correspondingly, the actual display position of the first system control may include the first horizontal coordinate and the first vertical coordinate, that is, coordinates of the point D in the first coordinate system are (the first horizontal coordinate, the first vertical coordinate). The first horizontal coordinate is a product of the second horizontal coordinate and the determined scaling ratio, and the first vertical coordinate is a product of the second vertical coordinate and the determined scaling ratio.

To be specific, when the scaling ratio and the preset display position of the first system control are known, the horizontal coordinate of the first system control displayed in the first window may be obtained by using the second horizontal coordinate×the scaling ratio, and the vertical coordinate of the first system control displayed in the first window may be obtained by using the second vertical coordinate×the scaling ratio.

In this embodiment, the coordinates of the point C use the upper left corner of the screen as the origin, and the second horizontal coordinate and the second vertical coordinate represent a distance between the point C and the long edge of the screen and a distance between the point C and the short edge of the screen. After the second horizontal coordinate and the second vertical coordinate are separately multiplied by the scaling ratio, it is equivalent to that when the first window is scaled down relative to the screen, the distances are scaled down synchronously with the first window. In this way, it can be ensured that the scaled-down first system control can be completely displayed in the first window, and does not exceed the display region of the first window.

In embodiments of this application, a point that is on the first system control and that indicates a position of the first system control may be referred to as a reference point. In FIG. 8, an example in which the upper left corner of the first system control is the reference point is used for description. In another embodiment, the reference point may be any point on the first system control, for example, an upper right corner, a lower left corner, a lower right corner, or a central point of the first system control. This is not limited in embodiments of this application.

In some embodiments, the actual display position of the first system control includes a first horizontal coordinate and a first vertical coordinate that use an upper left corner of the screen as an origin. The preset display position of the first system control includes a second horizontal coordinate and a second vertical coordinate that use an upper left corner of the screen as an origin. Coordinates of an upper left corner of the first window include a third horizontal coordinate and a third vertical coordinate that use the upper left corner of the screen as an origin. The first horizontal coordinate is a value obtained by adding the third horizontal coordinate to a product of the second horizontal coordinate and the scaling ratio, and the first vertical coordinate is a value obtained by adding the third vertical coordinate to a product of the second vertical coordinate and the scaling ratio.

For ease of understanding, FIG. 8 is still used as an example. Any window, control, and the like displayed on the screen are in a same coordinate system. The coordinate system may be a screen coordinate system, that is, an upper left corner A of the screen is used as an origin, a direction from the origin A to the right is used as a positive axis of an X axis, and a direction from the origin A to the bottom is used as a positive axis of a Y axis. As shown in (a) in FIG. 8, coordinates of the point A are (0, 0), coordinates of a point B at an upper left corner at the first window are (the third horizontal coordinate; the third vertical coordinate), the preset display position of the first system control is represented by an upper left corner C of the first system control, and coordinates of the point C are (the second horizontal coordinate, the second vertical coordinate); and the actual display position of the first system control is represented by an upper left corner D of the first system control that is scaled, and coordinates of the point D are (the first horizontal coordinate, the first vertical coordinate). In this case, the first horizontal coordinate may be obtained by using the second horizontal coordinate×the scaling ratio+the third horizontal coordinate, and the first vertical coordinate may be obtained by using the second vertical coordinate×the scaling ratio+third vertical coordinate.

The display position of the first system control changes with the position of the first window, so that it can be ensured that the first system control is completely displayed in the display region of the first window.

Figure 9A:
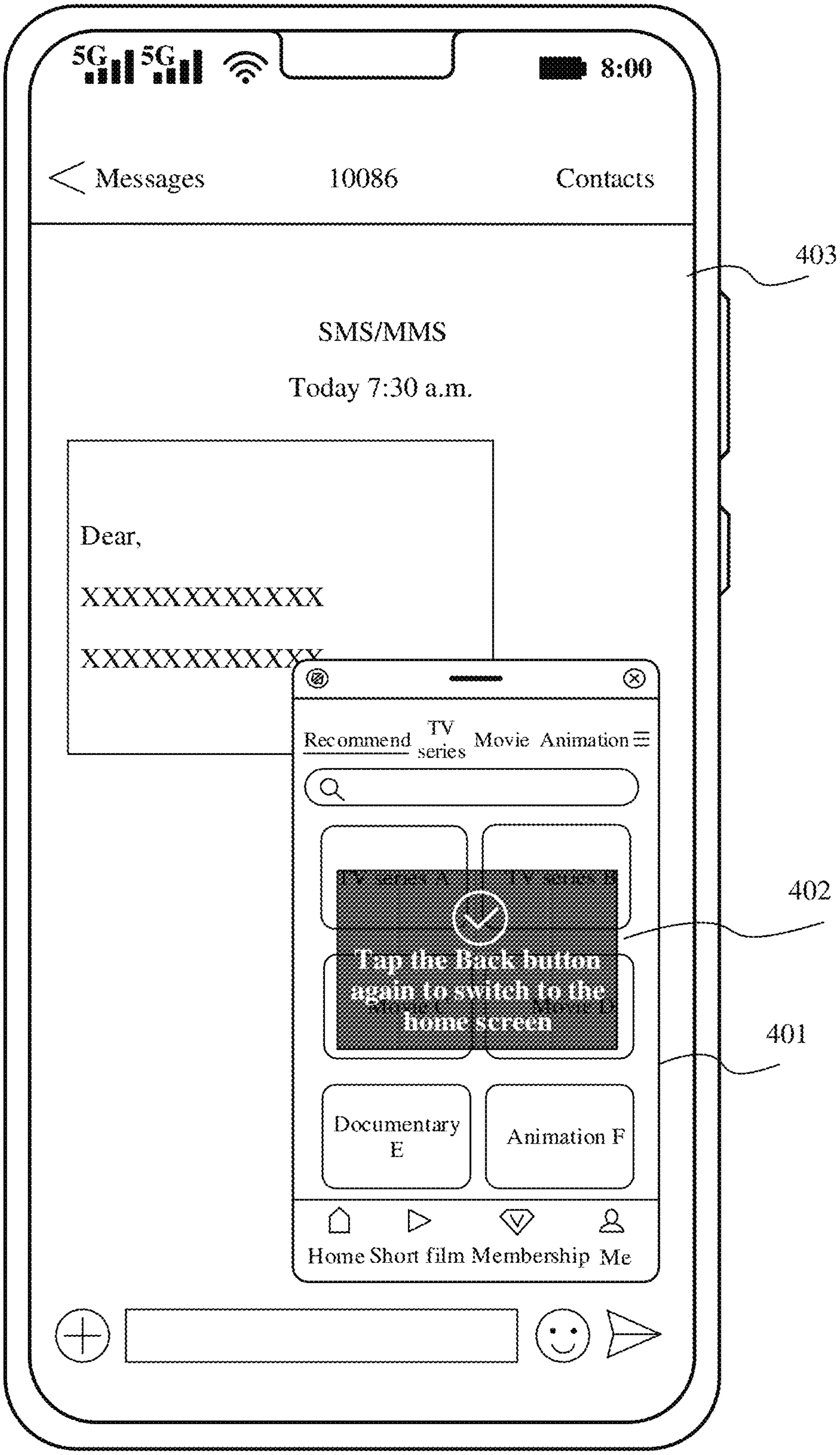
FIG. 9(*a*) and FIG. 9(*b*) are diagrams of a group of user interfaces according to an embodiment of this application.
Figure 9B:
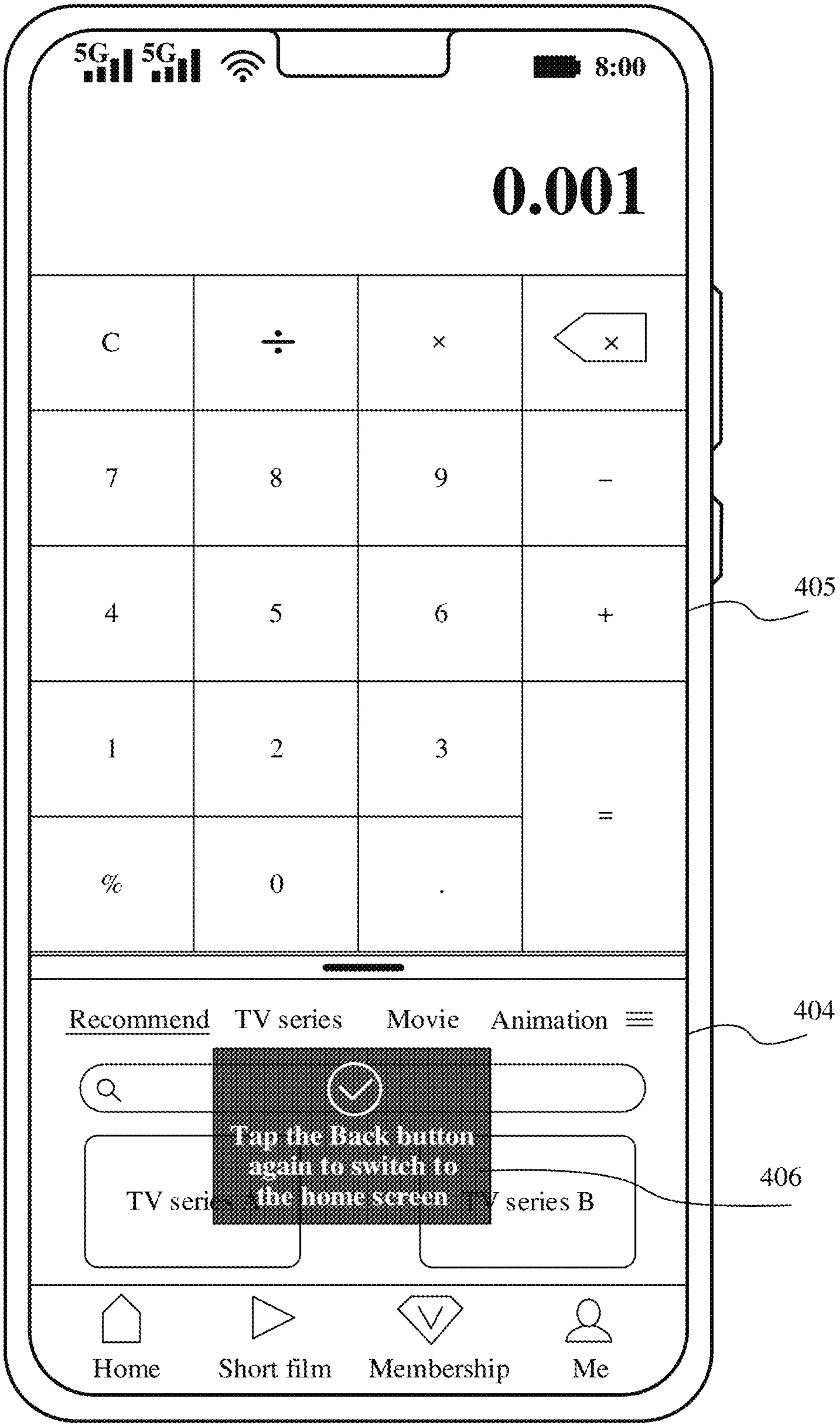

FIG. 9(*a*) and FIG. 9(*b*) are diagrams of user interfaces according to an embodiment of this application.

As shown in FIG. 9(*a*), an application displayed in a window 401 is a window-based application, and the window-based application is displayed above another full-screen window 403 in a floating manner. When the user performs an operation on the window-based application, for example, taps a Back button, the window-based application invokes a system dialog control 402, to prompt the user to "Tap the Back button again to switch to the home screen". The electronic device performs the control display method provided in this embodiment of this application, so that the dialog control 402 is displayed in the middle of the window 401 and does not exceed a display region of the window 401. In this case, an actual display position and an actual display size of the dialog control 402 are adapted to the window 401, but the dialog control 402 is not located in the middle of the screen shown in FIG. 6(*a*), to remind the user that the application in the window 401 needs to be switched to the home screen.

As shown in FIG. 9(*b*), applications displayed in a window 404 and a window 405 both are window-based applications. Specifically, the two window-based applications each are a split-screen display application, the window 404 and the window 405 form an upper and lower split-screen form, and a display region of the window 405 is larger than a display region of the window 404. When the user performs an operation on the window-based application in the window 404, for example, taps a Back button, the window-based application invokes a system dialog control 406, to prompt the user to "Tap the Back button again to switch to the home screen". The electronic device performs the control display method provided in this embodiment of this application, so that the dialog control 406 is displayed at the middle of the window 404 and does not exceed a display region of the window 404. In this case, an actual display position and an actual display size of the dialog control 406 are adapted to the window 404, but the dialog control 406 is not located in the middle of the screen shown in FIG. 6(*b*), to remind the user that the application in the window 404 needs to be switched to the home screen.

In some embodiments, before step S320, the method 300 may further include the following steps S1 to S5.

S1: The electronic device receives the operation performed by the user on the first application.

For example, this step may be performed by an input module in the electronic device. Specifically, a sensor module or the like at a HAL layer may identify an action of the user.

S2: The electronic device determines, based on the operation, that the first application invokes the first system control.

S3: The electronic device determines, based on a size of the first window, that the first application is the window-based application.

Herein, the electronic device needs to determine whether the first system control is displayed in a manner of being adapted to the screen or in a manner of being adapted to the window. When determining that the first application is the window-based application, the electronic device may determine that the first system control is displayed in the manner of being adapted to the first window. If the first application is the full-screen application, it may be determined that the first system control is displayed in the manner of being adapted to the screen.

S4: The electronic device determines the scaling ratio based on the size of the first window and a size of the screen.

In this step, for a manner of determining the scaling ratio, refer to the foregoing descriptions. For brevity, details are not described herein again. During specific implementation, this step may be implemented by the window manger service WMS at the application framework layer shown in FIG. 2. The WMS may obtain the size of the first window and the size of the screen, to determine the scaling ratio of the first window to the screen in the foregoing manner.

S5: Update the default display position and the default display size of the first system control based on the scaling ratio to obtain the actual display position and the actual display size of the first system control.

In this step, for a manner of calculating the actual display position and the actual display size of the first system control, refer to the foregoing descriptions. For brevity, details are not described herein again. During specific implementation, this step may be implemented by the window manger service WMS at the application framework layer shown in FIG. 2. The WMS may update the actual display position and the actual display size of the first system control based on the scaling ratio and the default display position and the default display size of the first system control, and display the first system control in the display region of the first window.

In some embodiments, the first system control is any one of the following controls: a message prompt box, a system dialog box, an error pop-up box, a floating box, an input method window, and a system status bar.

In some embodiments, a Z order value of the first system control is greater than or equal to 2000 and less than or equal to 2999.

In some embodiments, a Z order value of the first window is greater than or equal to 1 and less than or equal to 99.

Figure 10:
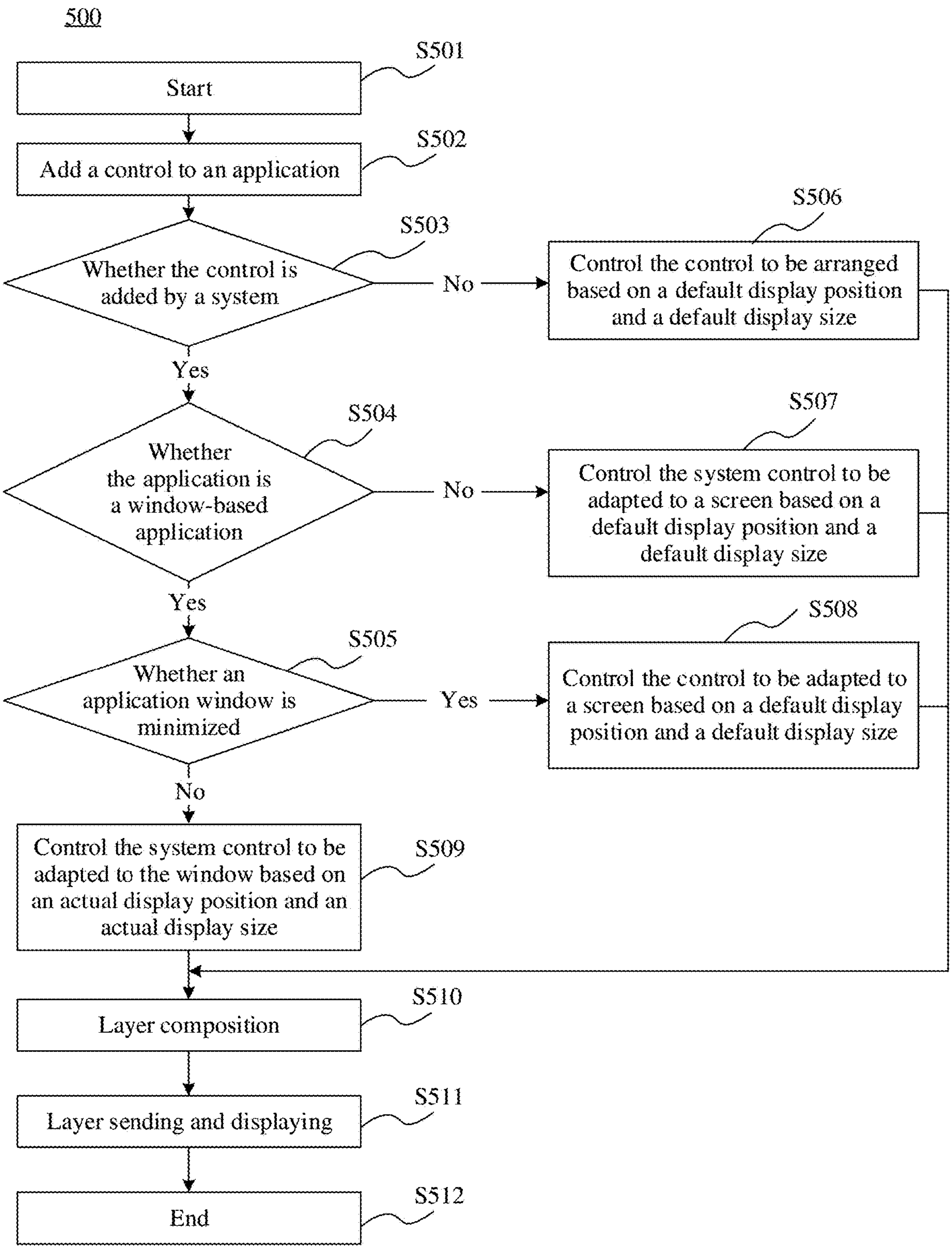
FIG. 10 is a schematic flowchart of a control display method according to an embodiment of this application.

FIG. 10 shows a schematic flowchart of a control display method according to an embodiment of this application. A method 500 shown in FIG. 10 is a specific example of the method 300. As shown in FIG. 10, the method 500 may include step S501 to step S510.

S501: Start.

In this step, an electronic device may display an application window on a screen, for example, display a window of a first application, namely, the first window described above.

S502: Add a control to the application.

For example, the application may have an addition of the control in response to an operation performed by a user on the first application. For example, the application receives an instruction for adding the control. Adding the control herein may be understood as displaying the control in a display region of the application window.

In this step, the application may add a system control or a customized control.

S503: Determine whether the control is added by a system.

That is, the electronic device determines whether the control added to the application is a system control.

If the control added to the application is not the system control, step S506 of controlling the control to be arranged based on a default display position and a default display size is performed.

If the control added to the application is the system control, step S504 is performed.

S504: Determine whether the application is a window-based application.

That is, the electronic device determines whether it is possible for the system control to exceed the display region of the window when the application invokes the system control.

If the application is not the window-based application, step S507 of controlling the system control to be adapted to the screen based on the default display position and the default display size is performed.

If the application is the window-based application, step S505 is performed.

S505: Determine whether the application window is minimized.

That is, the electronic device needs to determine whether the system control needs to be displayed on the screen.

If the application window is minimized, step S508 of controlling the system control to be adapted to the screen based on the default display position and the default display size is performed.

If the application window is not minimized, step S509 is performed.

S509: Control the system control to be adapted to the window based on an actual display position and an actual display size.

That is, when the application window is displayed on the screen and the application is the window-based application, the system control is controlled to follow the window. For a manner of determining the actual display position and the actual display size of the system control, refer to related descriptions of the method 300. For brevity, details are not described herein again.

S510: Perform layer composition.

In this step, the electronic device may perform layer composition by using a process shown in FIG. 5. The process of layer composition is the same as that in the existing solution. Details are not described herein again.

S511: Perform layer sending and displaying.

In this step, the electronic device sends a composited layer to the display for display. When the application window is displayed on the screen, the control added by the application can be viewed by the user.

S512: End.

In some embodiments, the foregoing steps S503 to S509 may be performed by a window manger service WMS. Step S510 and step S511 may be performed by a SurfaceFlinger service. Specifically, the SurfaceFlinger service mixes content of a plurality of layers based on a Z order, and outputs mixed content for display.

It should be noted that steps S503, S504, and S505 may be synchronously performed, or may be sequentially performed. This is not limited in embodiments of this application.

Figure 11:
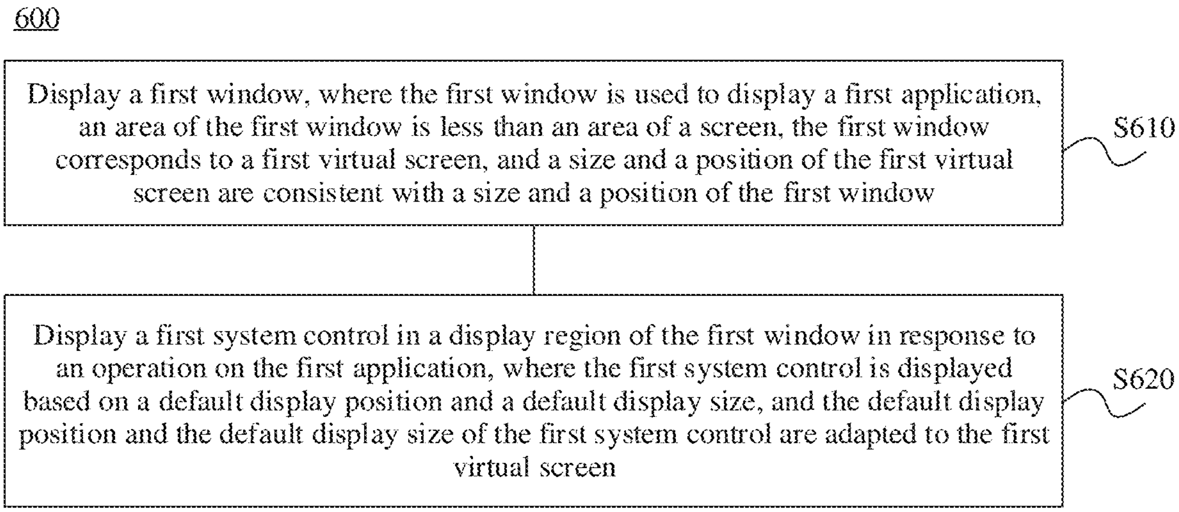
FIG. 11 is a schematic flowchart of a control display method according to an embodiment of this application.

FIG. 11 shows a schematic flowchart of a control display method according to an embodiment of this application. The method is applied to an electronic device, and the electronic device may be, for example, the electronic device 100 shown in FIG. 1. As shown in FIG. 11, the method 600 includes step S610 and step S620.

S610: Display a first window, where the first window is used to display a first application, an area of the first window is less than an area of a screen, the first window corresponds to a first virtual screen, and a size and a position of the first virtual screen are consistent with a size and a position of the first window.

Herein, the first virtual screen is created when the first application is created. The first virtual screen and the first window are the same in both position and size.

S620: Display a first system control in a display region of the first window in response to an operation performed by a user on the first application, where the first system control is displayed based on a default display position and a default display size, and the default display position and the default display size of the first system control are adapted to the first virtual screen.

In this embodiment of this application, when the first application is created, a virtual screen, namely, the first virtual screen, may be correspondingly created. In this way, a window-based application may be implemented based on the first virtual screen. Correspondingly, the system control may be adapted based on a size of the first virtual screen, instead of a size of an actual screen of the electronic device. In this way, the default display position and the default display size of the system control are adapted to the first virtual screen, that is, adapted to the first window. Therefore, the system control does not exceed the display region of the first window, thereby improving user experience.

Figure 12:
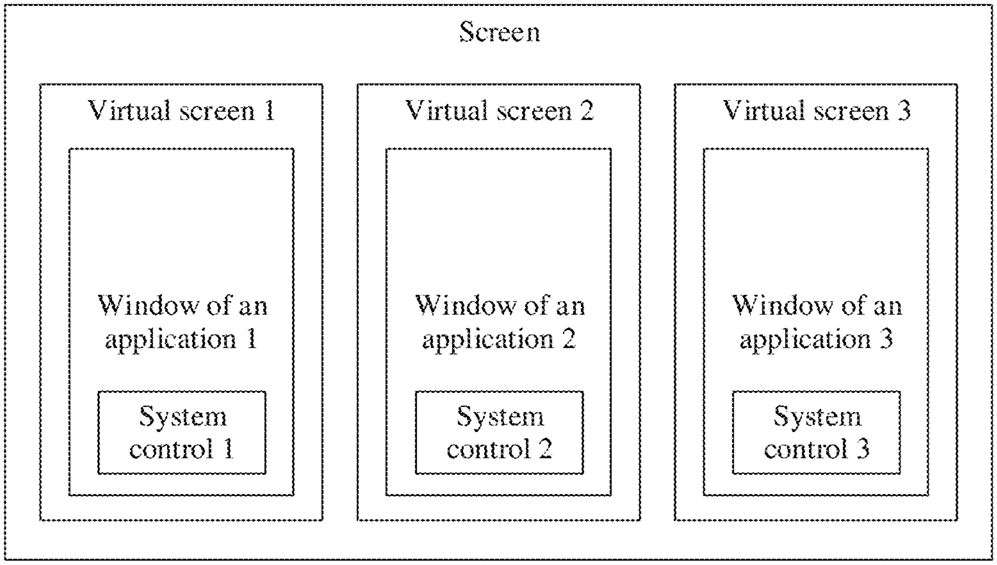
FIG. 12 is a diagram of a control display method according to an embodiment of this application.

FIG. 12 shows a diagram of a control display method according to an embodiment of this application. As shown in FIG. 12, an outermost box represents a size of a screen of an electronic device. In a process in which the method 600 shown in FIG. 11 is applied, each window-based application created by a system side may be implemented based on a virtual screen. That is, each time a window-based application is created, a virtual screen of a corresponding size and position is created. For example, a window of an application 1, a window of an application 2, and a window of an application 3 are created on the screen of the electronic device. Correspondingly, the electronic device further correspondingly creates a virtual screen 1 corresponding to the window of the application 1, a virtual screen 2 corresponding to the window of the application 2, and a virtual screen 3 corresponding to the window of the application 3. In this way, a system control 1 invoked by the window of the application 1 is implemented based on the virtual screen 1, and a size and a position of the system control 1 are adapted to the virtual screen 1; a system control 2 invoked by the window of the application 2 is implemented based on the virtual screen 2, and a size and a position of the system control 2 are adapted to the virtual screen 2; and a system control 3 invoked by the window of the application 3 is implemented based on the virtual screen 3, and a size and a position of the system control 3 are adapted to the virtual screen 3. The system control invoked by the window-based application is adapted based on a size and a position of the virtual screen adapted to the window instead of the size and a position of the outermost screen. The system control does not offset, and therefore the system control is prevented from exceeding an actual display region of the corresponding window, thereby improving user experience.

In some embodiments, the system control mentioned above may be a message prompt box, a system dialog box, an error pop-up box, a floating box, an input method window, a system status bar, or the like.

Figure 13A:
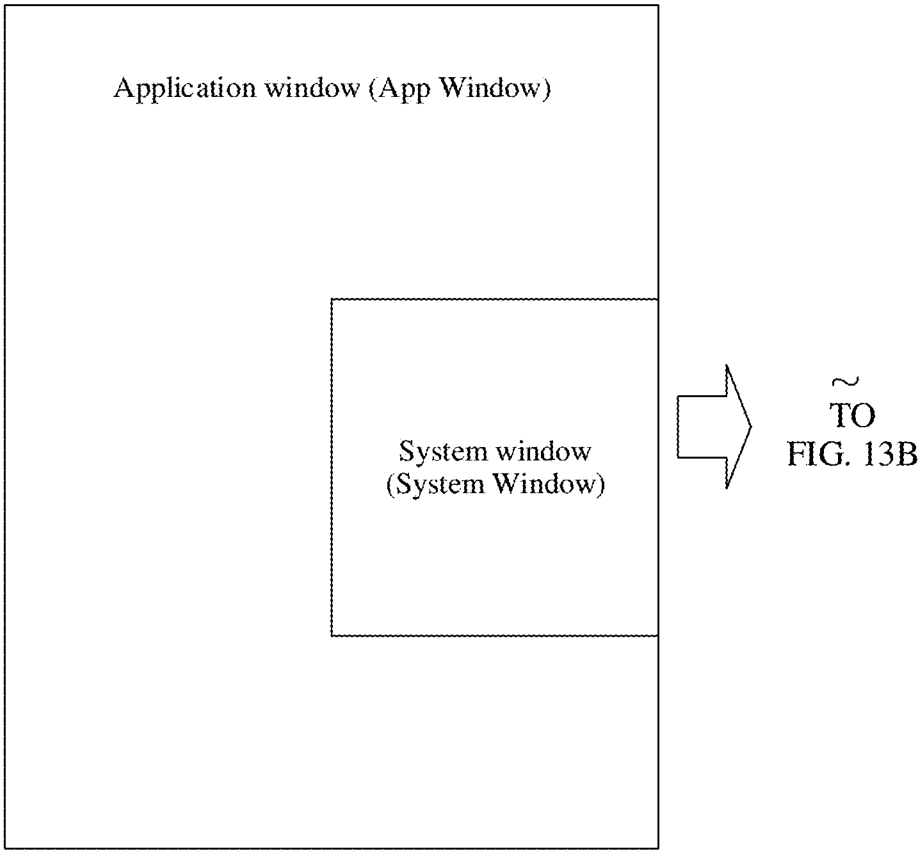
FIG. 13A and FIG. 13B are diagrams of a control according to an embodiment of this application.
Figure 13B:
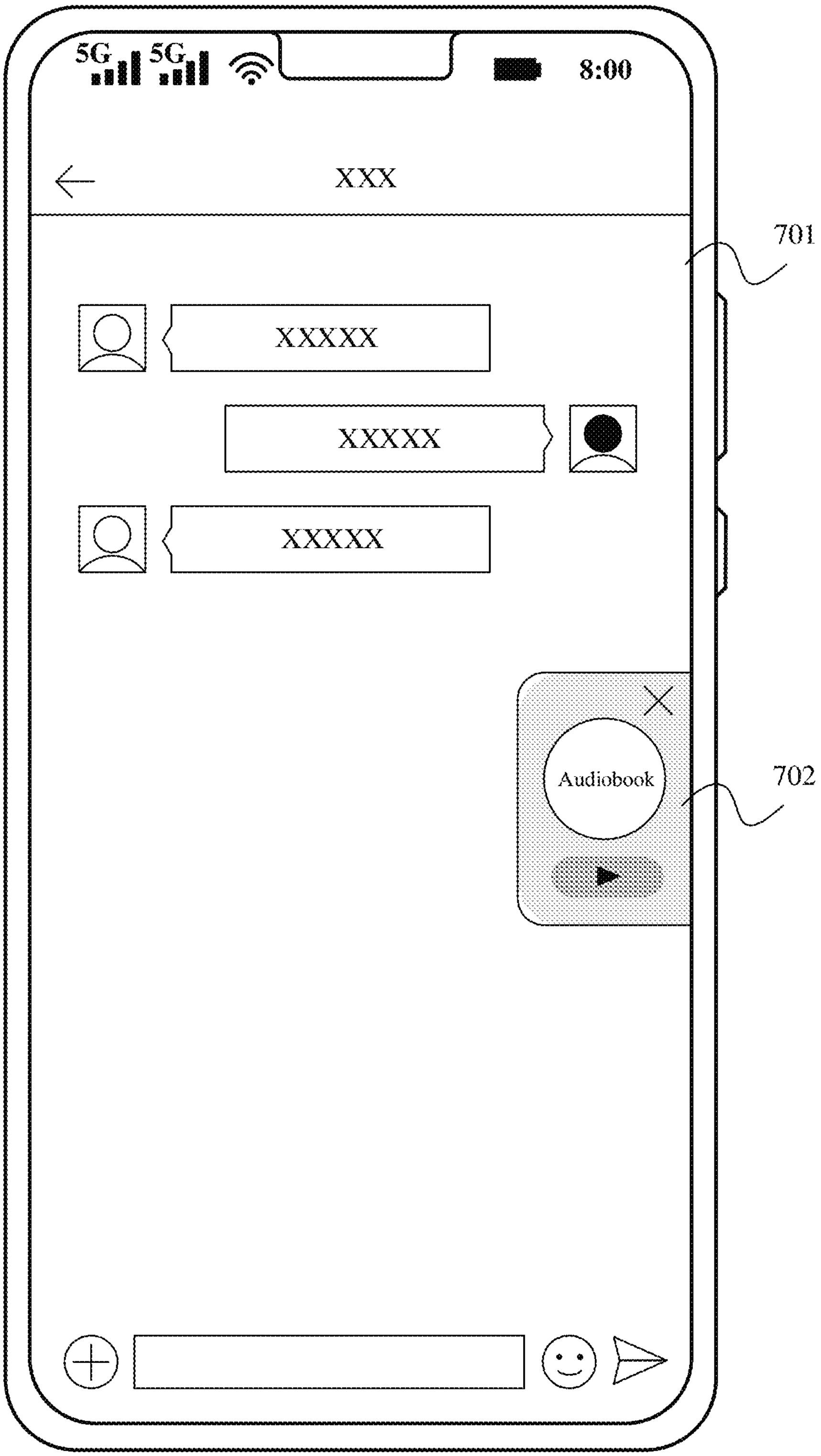

Certainly, in some embodiments, the system control mentioned above may not include a floating box. The floating box may also be referred to as a floating window popup box, and a type of the floating box is usually represented as TYPE_SYSTEM_OVERLAY. FIG. 13A and FIG. 13B are diagrams of a setting position of a floating box and a diagram of a user interface. As shown in FIG. 13A and FIG. 13B, a system control 702 is an example of a floating box, and the floating box is usually displayed above a window (for example, a window 701) in a floating manner along a left side or a right side of a screen. A type of a window of the TYPE_SYSTEM_OVERLAY type is a floating control that is provided by a system for a third-party application to implement a floating effect. That is, the floating control needs to float on the screen. Therefore, the floating control does not need to follow a size and a position of an application window.

In some embodiments, when a third party needs to have an addition of a control, a type of the control is not the floating control, and an application window is not minimized, the control display method provided in embodiments of this application may be performed, so that a to-be-added system control follows a size and a position of the application window.

With reference to FIG. 7 to FIG. 13B, the foregoing focuses on the control display method applied to the system control. When the window-based application invokes the system control, the size and the position of the control may be updated based on a ratio of the application window, so that the position of the system control does not exceed the actual display region of the window.

In some other embodiments, the control display method provided in embodiments of this application may further be applied to a customized control. As mentioned above, the customized control allows an application to set a position of the customized control on a screen or a display position of the customized control in a window. However, most applications specify the position of the customized control on the screen from a perspective of full-screen adaptation, and a window-based display effect is not considered. As a result, a display exception occurs.

For example, for a specific customized control, a developer may specify a type and a position of the control in a code field in an application development phase, where the position of the control may be represented by using coordinates. In some cases, the position of the control that is specified by the developer is adapted to a full screen. In this case, a horizontal coordinate and a vertical coordinate corresponding to the control are fixed values. For example, the horizontal coordinate is 100, and the vertical coordinate is 300. In this way, the control position specified by the application can only be adapted to the full screen, but cannot be adapted to a window. Therefore, when a window-based application actively invokes the customized control, a parameter of the display position of the customized control may be abnormal. For example, the coordinates of the customized control are not adapted based on an actual size of the window, and as a result, the coordinates exceed a display region of the window. Consequently, the position of the control also exceeds the display region of the window, affecting user experience.

Figure 14:
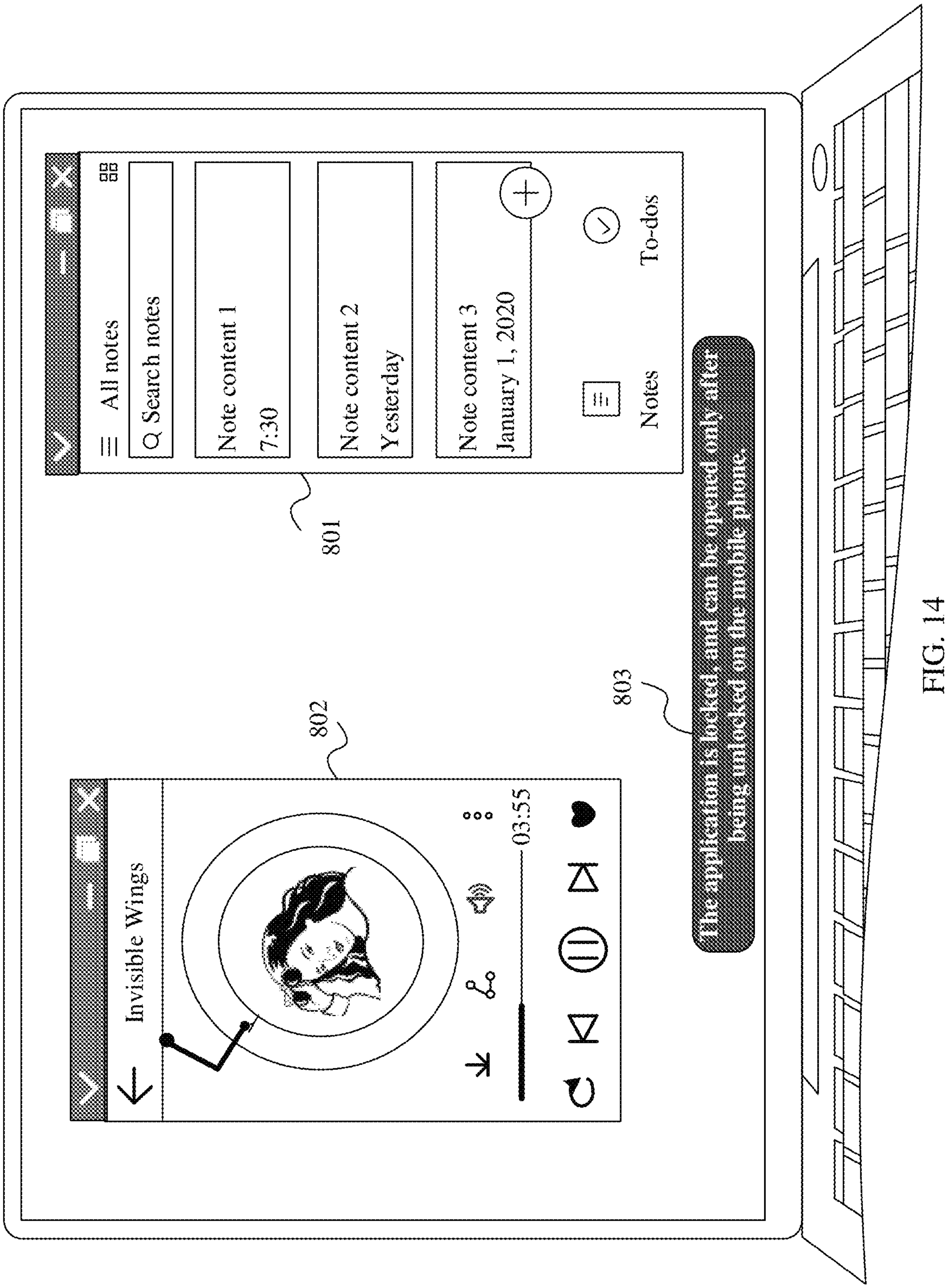
FIG. 14 is a diagram of a user interface of an existing control display solution.

For example, as shown in FIG. 14, when projection is performed on an electronic device to a display or an electronic device with a screen of a larger size is used, a plurality of window-based applications (for example, floating display applications) may be started on the screen, for example, a window 801 and a window 802 shown in FIG. 14. When an application in the window 801 needs to invoke a customized control 803, because a display position of the customized control 803 is fixed relative to the screen, a position of the control 803 exceeds a display region of the window 801, and a user cannot determine which application pops up the content. This heavily affects user experience.

Figure 15:
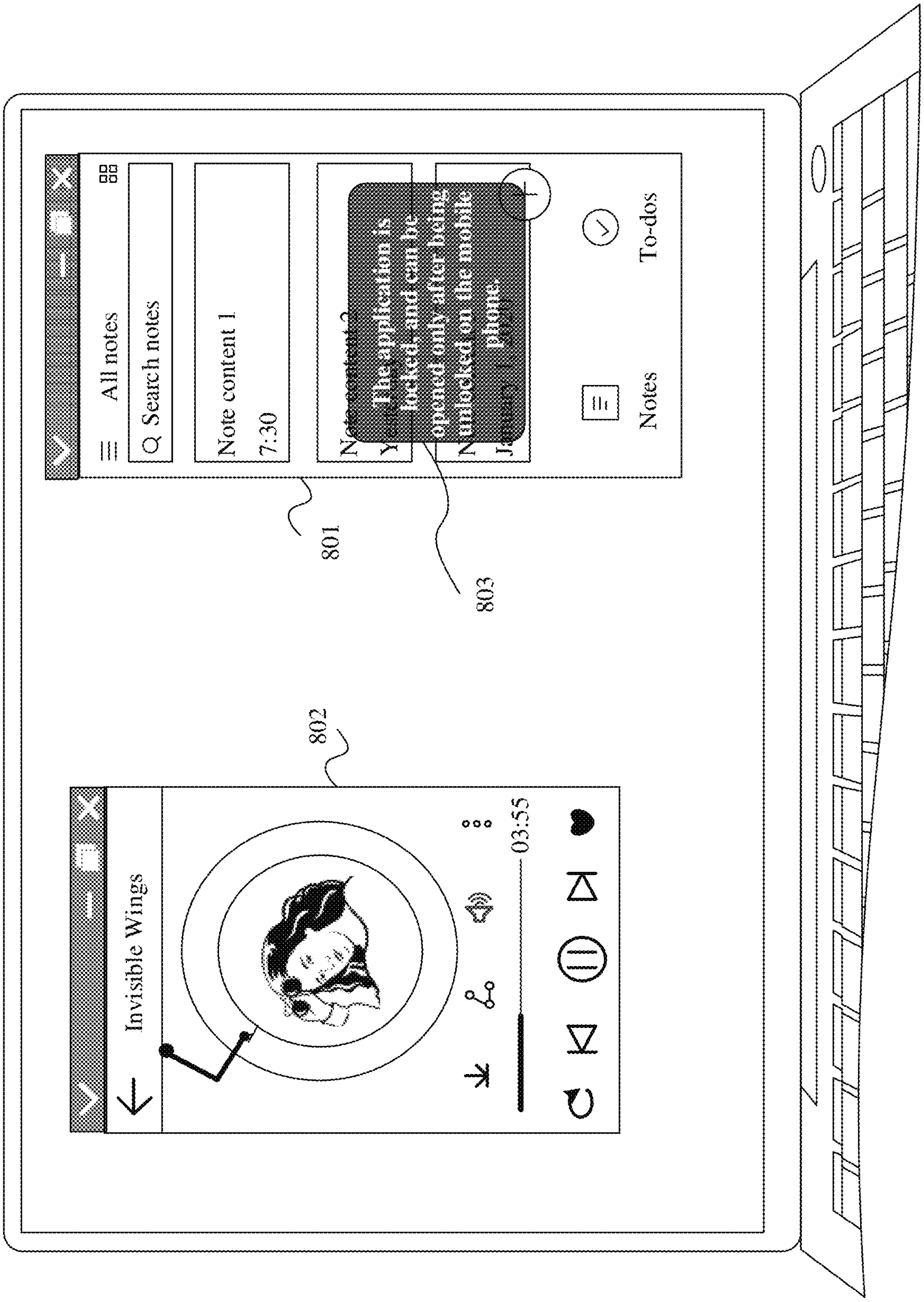
FIG. 15 is a diagram of a user interface according to an embodiment of this application.

Therefore, the control display method provided in embodiments of this application is further applicable to a customized control having a fixed display position. For example, as shown in FIG. 15, in the control display method provided in this application, the customized control 803 changes with the window 801, to be displayed in the display region of the window 801.

A process in which the control display method provided in this embodiment of this application is applied to a customized control is similar to a process in which the control display method described above is applied to a system control, provided that a corresponding system control is replaced with a customized control. For details, refer to the foregoing related descriptions. For brevity, details are not described herein again.

In conclusion, in a scenario in which a window-based application actively invokes a system control, or a size or a position of a control customized by an application exceeds an actual display region of a window, and consequently a position or a size of the control is abnormal, the control display method provided in this application can be used to implement control position compatibility, thereby improving user experience.

The control display method provided in embodiments of this application is mainly specifically implemented by a window manager service in an electronic device, so that a size and a position of a control can be adjusted at a system level, thereby resolving a problem that the control cannot be adapted to a window-based application.

It should be understood that, in embodiments of this application, only the Android® system is used as an example to describe the control display method. The control display method provided in embodiments of this application may be further applied to another operating system like iOS®, Microsoft®, or a HarmonyOS. For different operating systems, window management mechanisms may be different. However, the control display method provided in this application may be applied provided that there is a scenario in which a position and a size of a control cannot be adapted in a window-based manner.

The foregoing describes in detail the control display method provided in embodiments of this application with reference to FIG. 1 to FIG. 15. The following describes in detail apparatus embodiments of this application with reference to FIG. 16 to FIG. 17. It should be understood that descriptions of the method embodiments correspond to descriptions of the apparatus embodiments. Therefore, for a part that is not described in detail, refer to the foregoing method embodiments.

Figure 16:
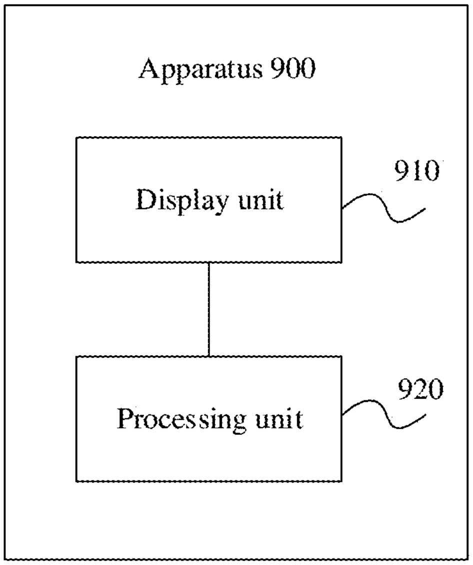
FIG. 16 is a block diagram of a structure of an apparatus according to an embodiment of this application.

FIG. 16 shows a diagram of a structure of an apparatus according to an embodiment of this application. An apparatus 900 may be located in the electronic device 100 shown in FIG. 1, or may be a specific example of the electronic device 100. The apparatus 900 can perform the steps in the method shown in FIG. 7 or FIG. 11, and may specifically implement the embodiments shown in FIG. 8 to FIG. 10, FIG. 12, and FIG. 15. To avoid redundancy, details are not described again.

As shown in FIG. 16, the apparatus 900 may include a display unit 910 and a processing unit 920.

The display unit 910 may be configured to perform steps S310 and S320 in the method 300, or perform steps S610 and S620 in the method 600. The display unit 910 is configured to perform display-related steps such as displaying a window, displaying an application interface, and displaying a control.

The processing unit 920 may be configured to perform step S503 to step S511 in the method 500. The processing unit 920 is mainly configured to perform steps such as control processing, layer composition, and layer sending and displaying.

Figure 17:
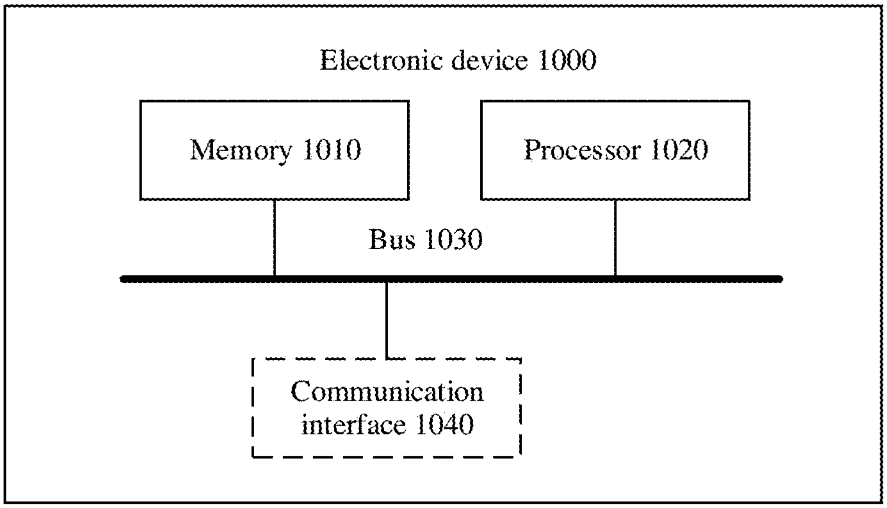
FIG. 17 is a block diagram of a structure of an electronic device according to an embodiment of this application.

FIG. 17 is a diagram of a structure of an electronic device according to an embodiment of this application. The electronic device 1000 shown in FIG. 17 may be a specific example of the electronic device 100 in FIG. 1.

The electronic device 1000 shown in FIG. 17 includes a memory 1010, a processor 1020, and a bus 1030. The memory 1010 and the processor 1020 implement a communication connection between each other through the bus 1030.

The memory 1010 may be a read only memory (read only memory, ROM), a static storage device, a dynamic storage device, or a random access memory (random access memory, RAM). The memory 1010 may store a program. When the program stored in the memory 1010 is executed by the processor 1020, the processor 1020 is configured to perform the steps of the control display method in embodiments of this application.

The processor 1020 may use a general purpose central processing unit (CPU), a microprocessor, an application specific integrated circuit (ASIC), a graphics processing unit (GPU), or one or more integrated circuits, and is configured to execute a related program, to implement the control display method in embodiments of this application.

The processor 1020 may be an integrated circuit chip and has a signal processing capability. In an implementation process, the steps in the control display method in this application may be implemented by using a hardware integrated logic circuit in the processor 1020, or by using instructions in a form of software. The foregoing processor 1020 may be a general purpose processor, digital signal processing (DSP), an application specific integrated circuit, a field programmable gate array (FPGA) or another programmable logic device, a discrete gate or transistor logic device, or a discrete hardware component. The processor may implement or perform the methods, the steps, and logical block diagrams that are disclosed in embodiments of this application. The general purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, for example, a random access memory, a flash memory, a read-only memory, a programmable read-only memory, an electrically erasable programmable memory, or a register. The storage medium is located in the memory 1010. The processor 1020 reads information in the memory 1010, and performs the control display method in embodiments of this application in combination with hardware of the processor 1020.

In some embodiments, the electronic device 1000 further includes a communication interface 1040. The communication interface 1040 uses a transceiver apparatus, for example but not limited to, a transceiver, to implement communication between the electronic device 1000 and another device or a communication network.

The bus 1030 may include a path for transferring information between components (for example, the memory 1010, the processor 1020, and the communication interface 1030) of the electronic device 1000.

An embodiment of this application further provides an electronic device, including one or more processors and one or more memories. The one or more memories store one or more computer programs, the one or more computer programs include instructions, and when the instructions are executed by the one or more processors, the electronic device is caused to perform the steps or specific embodiments in the methods shown in FIG. 7 to FIG. 13B and FIG. 15.

An embodiment of this application further provides a readable storage medium, including computer instructions. When the computer instructions are run on an electronic device, the electronic device is caused to perform the steps or specific embodiments in the methods shown in FIG. 7 to FIG. 13B and FIG. 15.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely an example. For example, division into the units is merely logical function division and may be other division in actual implementation. For example, a plurality of units or components may be combined or integrated into another system, or some features may be ignored or not performed. In addition, the displayed or discussed mutual couplings, direct couplings, or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in the form of a software product. The computer software product is stored in a storage medium and includes several instructions for instructing a computing device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, applied to an electronic device comprising a screen, the method comprising:

displaying a first window, wherein the first window displays a first application, an area of the first window is less than an area of the screen, the first window corresponds to a first virtual screen, the first virtual screen is created when the first window is created, wherein a size of the first virtual screen is consistent with a size of the first window, and wherein the first virtual screen is specific to the first window displaying the first application;

displaying a first system control in a display region of the first window in response to an operation performed by a user on the first application, wherein the first system control is displayed based on a default display position and a default display size, and the default display position and the default display size of the first system control are adapted to the first virtual screen instead of the screen such that the first system control is within the display region of the first window;

displaying a second window, wherein the second window displays a second application, an area of the second window is less than the area of the screen, the second window corresponds to a second virtual screen, the second virtual screen is created when the second window is created, and a size of the second virtual screen is consistent with a size of the second window;

displaying a second system control in a display region of the second window in response to a second operation performed by the user on the second application, wherein the second system control is displayed based on a second default display position and a second default display size, and the second default display position and the second default display size of the second system control are adapted to the second virtual screen instead of the screen such that the second system control is within the display region of the second window;

displaying a third window, wherein the third window displays a third application, an area of the third window is less than the area of the screen, the third window corresponds to a third virtual screen, the third virtual screen is created when the third window is created, and a size of the third virtual screen is consistent with a size of the third window; and displaying a third system control in a display region of the third window in response to a third operation performed by the user on the third application, wherein the third system control is displayed based on a third default display position and a third default display size, and the third default display position and the third default display size of the third system control are adapted to the third virtual screen instead of the screen such that the third system control is within the display region of the third window, wherein the first window, the first system control, the second window, the second system control, the third window, and the third system control are displayed simultaneously on the screen.

2. The method according to claim 1, wherein the default display position and the default display size of the first system control are adapted to the first window.

3. The method according to claim 1, wherein the first system control comprises one of following controls:

a message prompt box, a system dialog box, an error pop-up box, a floating box, an input method window, or a system status bar.

4. The method according to claim 1, wherein an actual display position of the first system control changes with a position of the first window, and the actual display position of the first system control does not exceed the position of the first window.

5. The method according to claim 1, wherein an actual display size of the first system control changes with the size of the first window, and the actual display size of the first system control does not exceed a range of the first window.

6. The method according to claim 1, wherein a Z-order value of the first system control is greater than or equal to 2000 and less than or equal to 2999.

7. The method according to claim 1, wherein the first window is a projection window.

8. The method according to claim 1, wherein the first virtual screen is created on the electronic device running the first application.

9. The method according to claim 1, wherein the second window is a second projection window, and the third window is a third projection window.

10. The method according to claim 1, wherein the size and a position of the first virtual screen are the same as the size and a position of the first window, respectively.

11. An electronic device, comprising:

at least one processor;

a memory; and a touchscreen, wherein the memory and the touchscreen are coupled to the at least one processor, the memory is configured to store computer program code, the computer program code comprises computer instructions, and when the at least one processor reads the computer instructions from the memory, the electronic device is enabled to perform operations as follows:

displaying a first window, wherein the first window displays a first application, an area of the first window is less than an area of the touchscreen, the first window corresponds to a first virtual screen, the first virtual screen is created when the first window is created, wherein a size of the first virtual screen is consistent with a size of the first window, and wherein the first virtual screen is specific to the first window displaying the first application;

displaying a first system control in a display region of the first window in response to an operation performed by a user on the first application, wherein the first system control is displayed based on a default display position and a default display size, and the default display position and the default display size of the first system control are adapted to the first virtual screen instead of the touchscreen such that the first system control is within the display region of the first window;

displaying a second window, wherein the second window displays a second application, an area of the second window is less than the area of the touchscreen, the second window corresponds to a second virtual screen, the second virtual screen is created when the second window is created, and a size of the second virtual screen is consistent with a size of the second window;

displaying a second system control in a display region of the second window in response to a second operation performed by the user on the second application, wherein the second system control is displayed based on a second default display position and a second default display size, and the second default display position and the second default display size of the second system control are adapted to the second virtual screen instead of the touchscreen such that the second system control is within the display region of the second window;

displaying a third window, wherein the third window displays a third application, an area of the third window is less than the area of the touchscreen, the third window corresponds to a third virtual screen, the third virtual screen is created when the third window is created, and a size of the third virtual screen is consistent with a size of the third window; and displaying a third system control in a display region of the third window in response to a third operation performed by the user on the third application, wherein the third system control is displayed based on a third default display position and a third default display size, and the third default display position and the third default display size of the third system control are adapted to the third virtual screen instead of the touchscreen such that the third system control is within the display region of the third window, wherein the first window, the first system control, the second window, the second system control, the third window, and the third system control are displayed simultaneously on the touchscreen.

12. The electronic device according to claim 11, wherein the default display position and the default display size of the first system control are adapted to the first window.

13. The electronic device according to claim 11, wherein the first system control comprises one of following controls:

a message prompt box, a system dialog box, an error pop-up box, a floating box, an input method window, or a system status bar.

14. The electronic device according to claim 11, wherein an actual display position of the first system control changes with a position of the first window, and the actual display position of the first system control does not exceed the position of the first window.

15. The electronic device according to claim 11, wherein an actual display size of the first system control changes with the size of the first window, and the actual display size of the first system control does not exceed a range of the first window.

16. The electronic device according to claim 11, wherein a Z-order value of the first system control is greater than or equal to 2000 and less than or equal to 2999.

17. The electronic device according to claim 11, wherein the first window is a projection window.

18. The electronic device according to claim 11, wherein the size and a position of the first virtual screen are the same as the size and a position of the first window, respectively.

* * * * *